(12) United States Patent
Larsson et al.

(10) Patent No.: US 11,019,581 B2
(45) Date of Patent: May 25, 2021

(54) METHOD AND ARRANGEMENT FOR POWER CONTROL HANDLING

(71) Applicant: Telefonaktiebolaget LM Ericsson (publ), Stockholm (SE)

(72) Inventors: Daniel Larsson, Stockholm (SE); Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/413,780

(22) PCT Filed: Sep. 26, 2014

(86) PCT No.: PCT/SE2014/051126
§ 371 (c)(1),
(2) Date: Jan. 9, 2015

(87) PCT Pub. No.: WO2015/047184
PCT Pub. Date: Apr. 2, 2015

(65) Prior Publication Data
US 2016/0183203 A1      Jun. 23, 2016

Related U.S. Application Data

(60) Provisional application No. 61/883,395, filed on Sep. 27, 2013, provisional application No. 61/883,420, filed on Sep. 27, 2013.

(51) Int. Cl.
*H04W 52/36* (2009.01)
*H04W 72/04* (2009.01)
(Continued)

(52) U.S. Cl.
CPC ......... *H04W 52/38* (2013.01); *H04W 52/241* (2013.01); *H04W 52/281* (2013.01);
(Continued)

(58) Field of Classification Search
CPC ............ H04W 52/241; H04W 52/346; H04W 52/365; H04W 52/367; H04W 52/38; H04W 72/0473
See application file for complete search history.

(56) References Cited

U.S. PATENT DOCUMENTS

2006/0146756 A1    7/2006  Wang et al.
2010/0197339 A1*  8/2010  Pedersen ............... H04W 52/34
                                                                    455/522

(Continued)

FOREIGN PATENT DOCUMENTS

CN          102484869 A      5/2012
WO     WO 2014/109687       7/2014

OTHER PUBLICATIONS

PCT Written Opinion of the International Preliminary Examining Authority in International Application No. PCT/SE2014/051126 dated Oct. 23, 2015, 10 pages.
(Continued)

*Primary Examiner* — Jamaal Henson
*Assistant Examiner* — M Mostazir Rahman
(74) *Attorney, Agent, or Firm* — Baker Botts, LLP

(57) ABSTRACT

A network node, a wireless device and methods therein are provided for handling transmit power control for contemporaneous links related to multi-connectivity. A method in a network node involves obtaining a separate maximum transmit power value for a wireless device per contemporaneous link; and transmitting at least one of the obtained maximum transmit power values to another network node, thereby enabling the other network node to control the transmit power of the wireless device for a link corresponding to at least one of the obtained maximum transmit power values.

18 Claims, 9 Drawing Sheets

(51) Int. Cl.
   *H04W 52/38*   (2009.01)
   *H04W 52/24*   (2009.01)
   *H04W 52/34*   (2009.01)
   *H04W 52/28*   (2009.01)
   *H04W 72/12*   (2009.01)
   *H04L 5/00*    (2006.01)
   *H04L 5/14*    (2006.01)

(52) U.S. Cl.
   CPC ....... *H04W 52/346* (2013.01); *H04W 52/365* (2013.01); *H04W 52/367* (2013.01); *H04W 52/386* (2013.01); *H04W 72/0473* (2013.01); *H04W 72/12* (2013.01); *H04L 5/001* (2013.01); *H04L 5/0023* (2013.01); *H04L 5/0048* (2013.01); *H04L 5/1469* (2013.01); *H04W 52/245* (2013.01)

(56) References Cited

U.S. PATENT DOCUMENTS

| | | | |
|---|---|---|---|
| 2010/0255868 A1 | 10/2010 | Lee et al. | |
| 2010/0291884 A1* | 11/2010 | Hu | H04W 72/0473 455/101 |
| 2011/0038271 A1* | 2/2011 | Shin | H04W 52/146 370/252 |
| 2011/0286341 A1* | 11/2011 | Sanayei | H04B 7/024 370/252 |
| 2012/0196643 A1* | 8/2012 | Xiao | H04W 52/30 455/522 |
| 2013/0044831 A1* | 2/2013 | Narasimha | H04W 52/365 375/260 |
| 2013/0148619 A1* | 6/2013 | Ahn | H04W 52/365 370/329 |
| 2013/0176953 A1 | 7/2013 | Stern-Berkowitz et al. | |
| 2014/0295909 A1* | 10/2014 | Ouchi | H04W 52/242 455/522 |
| 2015/0208358 A1* | 7/2015 | Ahn | H04W 52/146 455/522 |

OTHER PUBLICATIONS

International Search Report for International application No. PCT/SE2014/051126, dated Dec. 12, 2014.
PCT Written Opinion of the International Searching Authority for International application No. PCT/SE2014/051126, dated Dec. 12, 2014.
3rd Generation Partnership Project; Technical Specification Group Radio Access Network; Evolved Universal Terrestrial Radio Access (E-UTRA); Physical layer procedures (Release 12), 2014.
3rd Generation Partnership Project; Technical Specification Group Radio Access Network; Evolved Universal Terrestrial Radio Access (E-UTRA); Radio Resource Control (RRC); Protocol specification (Release 12), 2014.
Notice of the Result of Substantive Examination issued by the Ministry of Law and Human Right of the Republic of Indonesia, Directorate General of Intellectual Property for Patent Application No. P00201601592—dated Dec. 1, 2018.
First Office Action issued by the State Intellectual Property Office of People's Republic of China for Application No. 201480053052.3 (English translation and Summary attached)—dated May 14, 2018.
Communication Pursuant to Article 94(3) EPC issued for Application No. 14 790 793.5-1219—dated Jan. 19, 2018.
Communication Pursuant to Article 94(3) EPC issued for Application No. 14 790 793.5-1219—dated May 14, 2018.
The Second Office Action issued by the China National Intellectual Property Administration for Application No. 201480053052.3—dated Dec. 19, 2018.
Chinese Reexamination Notification issued for Application No. 201480053052.3—dated Apr. 16, 2020.
Examination Report issued by the Intellectual Property India for Application No. 2016/47010082—dated Jan. 17, 2020.
Chinese Office Action issued for Application No. 2019060501657230—dated Jun. 11, 2019.

\* cited by examiner

METHOD AND ARRANGEMENT FOR POWER CONTROL HANDLING

PRIORITY

This nonprovisional application is a U.S. National Stage Filing under 35 U.S.C. § 371 of International Patent Application Serial No. PCT/SE2014/051126, filed Sep. 26, 2014 and entitled "Method and Arrangement for Power Control Handling" which claims priority to U.S. Provisional Patent Application No. 61/883,395 filed Sep. 27, 2013 and U.S. Provisional Patent Application No. 61/883,420 filed Sep. 27, 2013.

TECHNICAL FIELD

The solution described herein relates generally to handling of power control, and in particular to handling of transmit power control for a wireless device at multi-connectivity.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 Hz when carrier aggregation is employed. LTE is also able to operate in different frequency bands and can operate in at least Frequency Division Duplex (FDD) and Time Division Duplex (TDD) modes.

LTE uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1a, where each resource element corresponds to one OFDM subcarrier during one OFDM symbol interval.

In the time domain, LTE downlink transmissions are organized into radio frames of 10 ms, each radio frame consisting of ten equally-sized subframes of length $T_{subframe}$=1 ms Furthermore, the resource allocation in LTE is typically described in terms of resource blocks, PRBs, where a resource block corresponds to one slot, 0.5 ms, in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the base station transmits control information indicating to which terminals and on which resource blocks the data is transmitted during the current downlink subframe. This control signaling is typically transmitted in the first 1, 2, 3 or 4 OFDM symbols in each subframe. A downlink system with 3 OFDM symbols as control region is illustrated in FIG. 3

Physical Uplink Control Channel

LTE uses hybrid-Automatic Repeat Request (ARQ), where, after receiving downlink data in a subframe, the terminal attempts to decode it and reports to the base station whether the decoding was successful (ACK) or not (NAK). In case of an unsuccessful decoding attempt, the base station can retransmit the erroneous data.

Uplink control signaling from the terminal to the base station comprises
 hybrid-ARQ acknowledgements for received downlink data;
 terminal reports related to the downlink channel conditions, used as assistance for the downlink scheduling; also known as Channel Quality Indicator (CQI);
 scheduling requests, indicating that a mobile terminal needs uplink resources for uplink data transmissions.

If the mobile terminal has not been assigned an uplink resource for data transmission, the Layer 1/Layer 2 (L1/L2) control information, e.g. channel-status reports, hybrid-ARQ acknowledgments, and scheduling requests, is transmitted in uplink resources, i.e. resource blocks specifically assigned for uplink L1/L2 control information on the Physical Uplink Control Channel (PUCCH).

Different PUCCH formats are used for the different information, e.g. PUCCH Format 1a/1b are used for hybrid-ARQ feedback, PUCCH Format 2/2a/2b for reporting of channel conditions, and PUCCH Format 1 for scheduling requests.
Physical Uplink Shared Channel To transmit data in the uplink the mobile terminal has to be assigned an uplink resource for data transmission, on the Physical Uplink Shared Channel (PUSCH). In contrast to a data assignment in downlink, in uplink the assignment must always be consecutive in frequency, this to retain the signal carrier property of the uplink as illustrated in FIG. 4. In Rel-10 this restriction may however be relaxed enabling non-noncontiguous uplink transmissions.

The middle Single Carrier (SC)-symbol in each slot is used to transmit a reference symbol. If the mobile terminal has been assigned an uplink resource for data transmission and at the same time instance has control information to transmit, it will transmit the control information together with the data on PUSCH.
Uplink Power Control for PUSCH and PUCCH Uplink power control is used both on the PUSCH and on PUCCH. The purpose is to ensure that the mobile terminal transmits with sufficiently high but not too high power since the latter would increase the interference to other users in the network. In both cases, a parameterized open loop combined with a closed loop mechanism is used. Roughly, the open loop part is used to set a point of operation, around which the closed loop component operates. Different parameters, e.g. targets and 'partial compensation factors', for user and control plane are used.

In more detail, for PUSCH the mobile terminal sets the output power according to $$P_{PUSCH,c}(i) = \min\left\{\begin{array}{l}P_{CMAX,c}(i),\\ 10\log_{10}(M_{PUSCH,c}(i)) + P_{O\_PUSCH,c}(j) + \\ \alpha_c(j)\cdot PL_c + \Delta_{TF,c}(i) + f_c(i)\end{array}\right\}[dBm],$$

where $P_{MAXc}$ is the maximum transmit power for the mobile terminal, $M_{PUSCHc}(i)$ is the number resource blocks assigned, $P_{O\_PUSCHc}(j)$ and $\alpha_c$ control the target received power, $PL_c$ is the estimated pathloss, $\Delta_{TFc}(i)$ is transport format compensator and $f_c(i)$ is the a UE specific offset or 'closed loop correction'. The function $f_c$ may represent either absolute or accumulative offsets. The index c numbers the component carrier and is only of relevance for Carrier Aggregation. For more detailed description see section 5.1.1.1 of 3GPP TS 36.213, v11.4.0 (incorporated in Annex 1 herewith). The PUCCH power control has a similar description, see section 5.1.2.1 of 3GPP TS 36.213, v 11.4.0 (incorporated in Annex 1 herewith).

The closed loop power control can be operated in two different modes, either accumulated or absolute. Both modes are based on Transmit Power Control (TPC) command, a command which is part of the downlink control signaling. When absolute power control is used, the closed loop correction function is reset every time a new power control command is received. When accumulated power control is used, the power control command is a delta correction with regard to the previously accumulated closed loop correction. The accumulated power control command is defined as $f_c(i)=f_c(i-1)+\delta_{PUSCHc}(i-K_{PUSCH})$, where $\delta_{PUSCHc}$ is the TPC command received in $K_{PUSCH}$ subframe before the current subframe i and $f_c(i-1)$ is the accumulated power control value. The absolute power control has no memory, i.e. $f_c(i)=\delta_{PUSCHc}(i-K_{PUSCH})$.

The PUCCH power control has in principle the same configurable parameters with the exception that PUCCH only has full pathloss compensation, i.e. does only cover the case of $\alpha=1$.

Power Headroom Reporting on PUSCH

In LTE Rel-8, the base station may configure the user equipment (UE) to send power headroom reports (PHRs) periodically or when the change in pathloss exceeds a configurable threshold. The power headroom reports indicate how much transmission power the UE has left for a subframe i, i.e., the difference between the nominal UE maximum transmit power and the estimated required power. The reported value is in the range of 40 to −23 dB, where a negative value shows that the UE did not have enough power to conduct the transmission.

The UE power headroom $PH_c$ for subframe i is defined as $$PH_c(i)=P_{CMAXc}-\{10\log_{10}(M_{PUSCHc}(i))+P_{O\_PUSCHc}(j)+\alpha_c(j)\cdot PL_c+\Delta_{TFc}(i)+f_c(i)\} \qquad (1)$$

where $P_{CMAXc}$, $M_{PUSCHc}(i)$, $P_{O\_PUSCHc}(J)$, $\alpha_c(j)$, $PL_c$, $\Delta_{TFc}(i)$ and $f_c(i)$ is defined under the heading "Uplink power control for PUSCH and PUCCH".

Power Headroom Reporting on PUCCH

It has been proposed to enable separate PHR for PUCCH if PUCCH can be transmitted simultaneously with PUSCH. In such cases either a separate PHR is provided for PUCCH $$PH_{PUCCHc}(i)=P_{CMAXc}-\{P_{O\_PUCCHc}+PL_c+h_c(n_{CQI},n_{HARQ})+\Delta_{F\_PUCCHc}(F)+g_c(i)\}, \qquad (2)$$

or it is combined with PUSCH, $$PH_{PUSCH\_and\_PUCCHc}(i)=P_{CMAXc}-\{P_{O\_PUCCHc}+PL_c+h_c(n_{CQI},n_{HARQ})+\Delta_{F\_PUCCHc}(F)+g_c(i)\}-\{10\log_{10}(M_{PUSCHc}(i))+P_{O\_PUSCHc}(j)+\alpha_c(j)\cdot PL_c+\Delta_{TFc}(i)+f_c(i)\}. \qquad (3)$$

The parameter definitions are specified in section 5 in 3GPP TS 36.213 v11.4.0 (see Annex 1) and under the heading "Uplink power control for PUSCH and PUCCH".

Dual Connectivity

Dual connectivity is a feature defined from the UE perspective wherein the UE may simultaneously receive and transmit to at least two different network points. Dual connectivity is one of the features that are considered for standardization within the umbrella work of small cell enhancements for LTE within 3GPP Rel-12.

Dual connectivity is defined for the case when the aggregated network points operate on the same or separate frequency. Each network point that the UE is aggregating may define a stand-alone cell or it may not define a stand-alone cell. It is further foreseen that from the UE perspective, the UE may apply some form of Time Division Multiplexing (TDM) scheme between the different network points that the UE is aggregating. This implies that the communication on the physical layer to and from the different aggregated network points may not be truly simultaneous. Thus, rather than purely simultaneous communications, dual connectivity may be regarded as providing support, to a wireless device, for contemporaneous communications with multiple network points, thus having multiple independent connections simultaneously. Here, "contemporaneous" should be understood as referring to events or things occurring or existing during the same period of time, where the periods of time relevant here are time periods relevant to wireless communications, i.e., on the scale of transmission time intervals, communications frame times, round-trip times, etc. The term "simultaneous" could alternatively have been used to describe the links, but the term contemporaneous is meant to indicate that the links need not be simultaneously started or be synchronized or aligned e.g. in terms of frame number, frame alignment, etc. It is when the contemporaneous links compete for the same transmission power during an overlapping time period that the problem addressed herein arises. A link may comprise a number of carriers, which may be referred to as a carrier group, CG. When referring to "a link" herein, it is a contemporaneous link that is referred to if it is not explicitly stated otherwise or obvious that it is another type of link.

Dual connectivity, or multi connectivity, as a feature bears many similarities with carrier aggregation and Coordinated Multipoint transmission/reception (CoMP); the main differentiating factor is that dual or multi connectivity is designed considering a relaxed backhaul and less stringent requirements on synchronization requirements between the network points. This is in contrast to carrier aggregation and CoMP wherein tight synchronization and a low-delay backhaul are assumed between connected network points.

SUMMARY

An object of the invention is to improve handling of transmit power control for a wireless device during dual-, or multi-connectivity.

According to a first aspect, a method is provided, which is to be performed by a network node. The method is suitable for enabling transmit power control of a wireless device that is configured to support two or more contemporaneous links with two or more corresponding wireless access points. The method comprises obtaining a separate maximum transmit power value for the wireless device per contemporaneous link; and further comprises transmitting at least one of the obtained maximum transmit power values to another network node. Thereby the other network node is enabled to control the transmit power of the wireless device for a link corresponding to at least one of the obtained maximum transmit power values. According to a second aspect, a method is provided, which is to be performed in a network node. The method is suitable for controlling the transmit power of a wireless device that is configured to support two or more contemporaneous links with two or more corresponding wireless access points. The method comprises obtaining a separate maximum transmit power value for the wireless device per contemporaneous link; and signaling the separate maximum transmit power values to the wireless device.

According to a third aspect, a method is provided, which is to be performed in a network node. The method is suitable for scheduling a wireless device, which is configured to support two or more contemporaneous links with two or more corresponding wireless access points. The method comprises obtaining a separate maximum transmit power value for the wireless device per contemporaneous link and receiving a power headroom report from the wireless device. The method further comprises scheduling the wireless device on one of the contemporaneous links, based on the obtained maximum transmit power value for that link, and on the received power headroom report.

According to a fourth aspect, a network node is provided, for enabling transmit power control of a wireless device that is configured to support two or more contemporaneous links with two or more corresponding wireless access points. The network node is configured to obtain a separate maximum transmit power value for the wireless device per contemporaneous link; and to transmit at least one of the obtained maximum transmit power values to another network node.

According to a fifth aspect, a network node is provided for transmit power control of a wireless device that is configured to support two or more contemporaneous links with two or more corresponding wireless access points, the network node is configured to obtain a separate maximum transmit power value for the wireless device per contemporaneous link; and to signal the separate maximum transmit power values to the wireless device.

According to a sixth aspect, a network node is provided for scheduling a wireless device, which is configured to support two or more contemporaneous links with two or more corresponding wireless access points. The network node is configured to obtain a separate maximum transmit power value for the wireless device per contemporaneous link, and to receive a power headroom report from the wireless device. The network node is further configured to schedule the wireless device on one of the contemporaneous links, based on the obtained maximum transmit power value for that link, and on the received power headroom report.

According to a seventh aspect, a method is provided, which is to be performed in a wireless device configured to support two or more contemporaneous links with two or more corresponding wireless access points. The method comprises receiving a separate maximum transmit power value for the wireless device for each contemporaneous link; and applying power control to transmissions on each contemporaneous link based on the maximum transmit power value corresponding to the respective link.

According to an eight aspect, a method is provide, which is to be performed in a wireless device configured to support two or more contemporaneous links with two or more corresponding wireless access points. The method comprises receiving a separate maximum transmit power value for each contemporaneous link, and receiving an indication to vary one or more of the maximum transmit power values according to a time pattern.

According to a ninth aspect, a wireless device is provided, which is configured to support two or more contemporaneous links with two or more corresponding wireless access points. The wireless device is configured to receive a separate maximum transmit power value for each contemporaneous link; and to apply power control to transmissions on each contemporaneous link based on the maximum transmit power value corresponding to the respective link.

According to a tenth aspect, a wireless device is provided, which is configured to support two or more contemporaneous links with two or more corresponding wireless access points. The wireless device is configured to receive a separate maximum transmit power value for each contemporaneous link, and to receive an indication to vary one or more of the maximum transmit power values according to a time pattern.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1A:
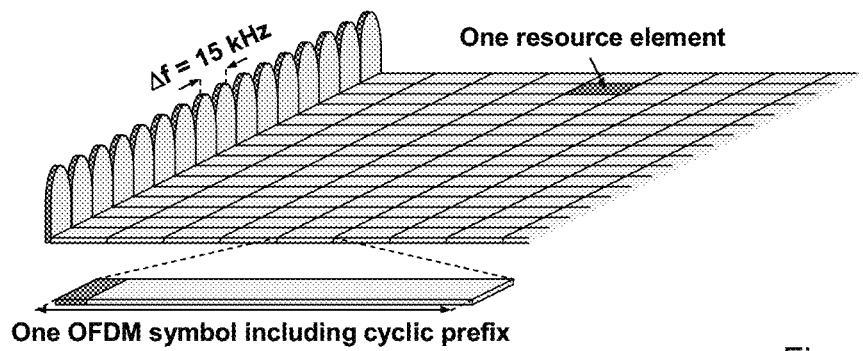
FIG. 1a illustrates the LTE downlink physical resource, according to the prior art.
Figure 1B:
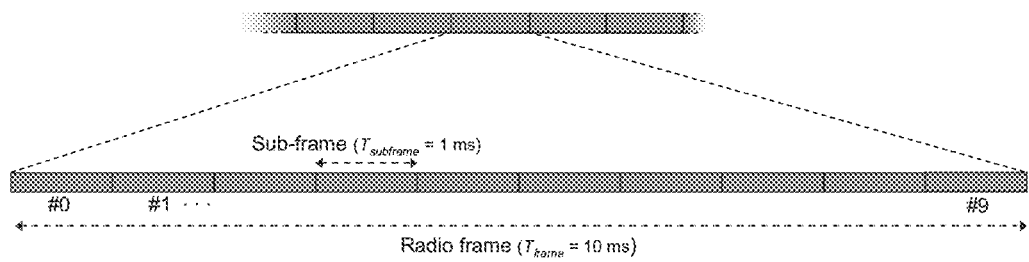
FIG. 1b illustrates the LTE time-domain structure, according to the prior art.
Figure 1C:
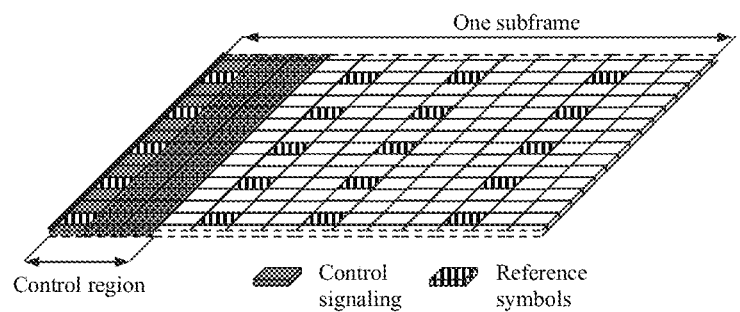
FIG. 1c illustrates an LTE downlink subframe, according to the prior art.
Figure 2:
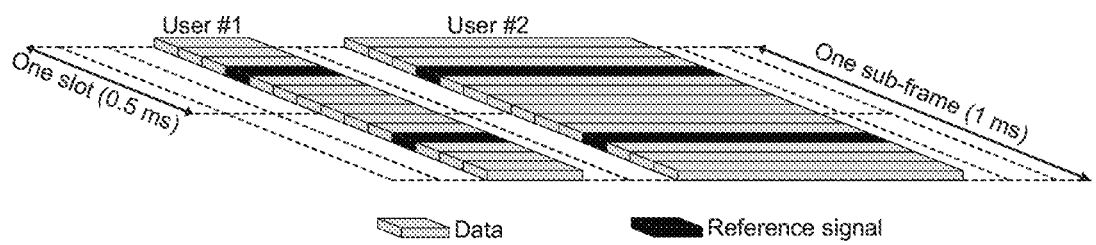
FIG. 2 shows a PUSCH resource assignment, according to the prior art.
Figure 3:
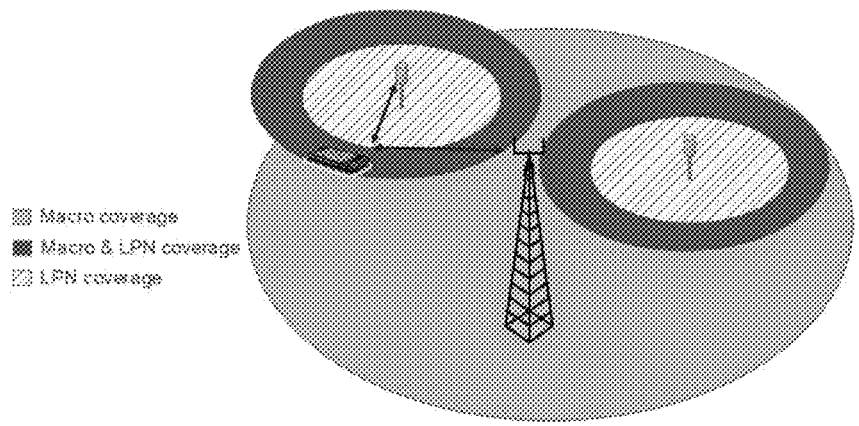
FIG. 3 illustrates dual connection.

One problem that arises in a dual connectivity scenario is that since a wireless device, such as a UE, is simultaneously connected to two wireless access points, e.g. eNBs, there are possibilities that a wireless device needs to share its limited uplink power while transmitting simultaneously towards two different wireless access points. Applying existing independent power control algorithms to each of two, or more, links may cause a situation where the wireless device cannot support both links with the requested power levels. This is because of the fact that two different and independent power control loops will provide two different, uncoordinated uplink power levels related to the links. Because of power limitations at the wireless device, the requested levels might not be possible to provide for the wireless device.

It is hence not clear how the network is able to perform uplink (UL) scheduling when the wireless device is able to transmit to multiple wireless access points in UL by making sure that the different scheduling wireless access points are not competing for the same available power at the wireless device.

Some embodiments disclosed herein describe how the network may control the amount of power that the wireless device will use for links to different wireless access points, thereby enabling operations from independent schedulers for UL.

Within the context of this disclosure, the term "wireless device" or "wireless terminal" encompasses any type of wireless node which is able to communicate with a network node, such as a base station, or with another wireless device by transmitting and/or receiving wireless signals. Thus, the term "wireless device" encompasses, but is not limited to: a user equipment, a mobile terminal, a stationary or mobile wireless device for machine-to-machine communication, an integrated or embedded wireless card, an externally plugged in wireless card, a dongle, etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" is referred to in this disclosure, this should be understood as encompassing any wireless device as defined above. Although certain figures herein show a device being equipped with a screen, button and speaker, this is also strictly for illustrative purpose, and should not be taken to imply that such features are required to be present for the operation of any of the embodiments presented herein.

It should be appreciated that although examples herein refer to an eNB for purposes of illustration, the concepts described apply also to other wireless access points. The expressions "network point" or "wireless access point" as used in this disclosure is intended to encompass any type of radio base station, e.g. an eNB, NodeB, a pico or micro node, Home eNodeB or Home NodeB, or any other type of network node which is capable of wireless communication with a wireless device.

In the present disclosure, the terms MeNB for Main eNB and SeNB for Secondary eNB, are used to describe two different roles that an eNB could have towards a UE. The nodes could alternatively be denoted Master eNB and Supporting eNB. We further assume for simplicity that there is only a single SeNB. In practice there could, however, be multiple SeNBs. Further, the concept of MeNB and SeNB could alternatively be referred to as anchor and assisting eNB.

The expression "network node" may refer to a wireless access point as defined above, but also encompasses other types of nodes residing in a wireless network and which are capable of communicating with one or more wireless access points either directly or indirectly, e.g. a centralized network node performing one or more specific functions. Furthermore it should be appreciated that a network node may at the same time serve as a wireless access point, and also perform one or more additional functions on behalf of other nodes or access points in the network.

EXEMPLIFYING EMBODIMENTS

Exemplifying method embodiments will be described below. Embodiments will first be described as seen from a perspective of a network node, which may be a wireless access point or a core network node, as described above. Further below, exemplifying method embodiments will be described as seen from a perspective of a wireless device, such as a UE.
Method in a Network Node.
Transmitting Obtained Maximum Transmission Power to Other Network Node.

Below, examples of embodiments of a method performed by a network node will be described with reference to FIGS. 5-8. The network node is operable in a wireless communication network comprising one or more wireless devices, which are configured to support two or more contemporaneous links with/to two or more wireless access points.

Figure 5:
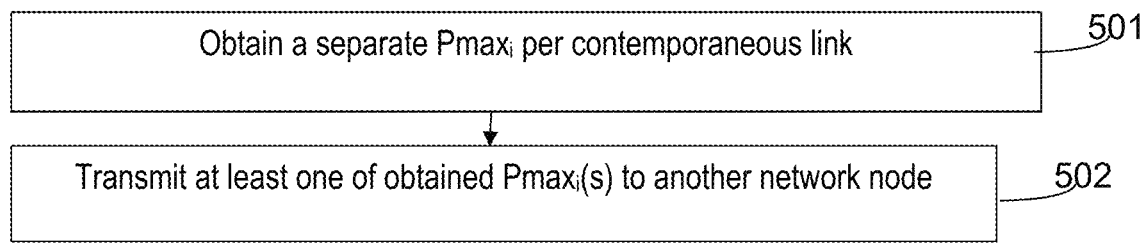
FIGS. 5-8 illustrate procedures in a Network Node, according to exemplifying embodiments.

A method performed by a network node is illustrated in FIG. 5. The network node obtains 501 a separate maximum transmit power value, $Pmax_i$, for a wireless device per contemporaneous link. The network node further transmits 502 at least one of the obtained $Pmax_i$s to another network node. By performing these actions, the other network node is enabled to control the transmit power of the wireless device for a link corresponding to at least one of the obtained maximum transmit power values.

In embodiments where the network node is a wireless access point, the other network node, to which the at least one obtained value is transmitted, would be another wireless access point. That is, when the network node is e.g. an MeNB, the other network node may be an SeNB, and vice versa. In this case, the at least one of the obtained maximum transmit power values could be transmitted 502 on the X2 interface between the wireless access points.

On the other hand, in embodiments where the network node is some other type of node, such as a core network node on a higher hierarchical level, the obtained $Pmax_i$s would be transmitted 502 to a wireless access point, such as an MeNB or an SeNB, e.g. over an S1 interface over a backhaul link.

Obtaining, or deriving, of a separate $Pmax_i$ per contemporaneous link could also be referred to as obtaining a separate $Pmax_i$ for each access point to which the wireless device is connected via a contemporaneous link. Alternatively, it could be described as that the network node obtains a maximum transmission power per wireless access point that the wireless device can access, or is configured to access, with dual or multi connectivity. The maximum transmission power obtained by the network node could be different or the same for different subframes, different channels, e.g. PUSCH, PUCCH, and/or for different signals, such as sounding reference symbols (SRS).

The term obtaining could herein refer to determining, e.g. calculating or otherwise deriving, the values, or, it could refer to receiving or retrieving the values from another node.

The separate maximum transmit power values, $Pmax_i$, may be determined based on a total power constraint for the wireless device.

For simplicity, the wireless device is below described as being configured to support two contemporaneous links, i.e. configured for dual connectivity. However, the different examples are also applicable for cases with more than two contemporaneous links.

Figure 4:
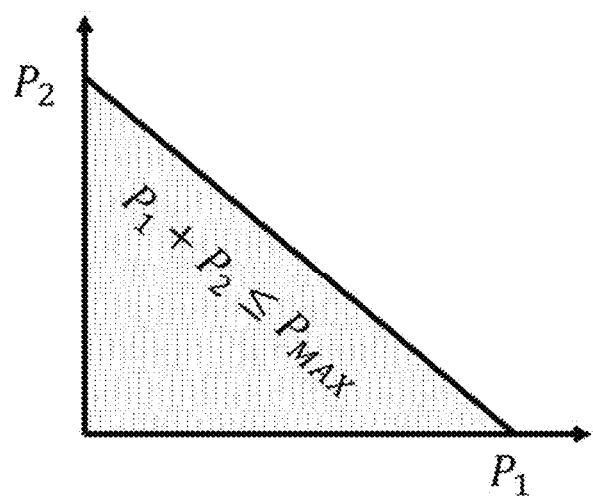
FIG. 4 illustrates a relationship between two power levels according to an embodiment.

A network node determines a maximum transmit power for each of the contemporaneous links. The power determined for, and assigned to, the contemporaneous links may be denoted e.g. as $P_1$ and $P_2$; $Pmax_1$ and $Pmax_2$; or, as P_MeNB and P_SeNB. Advantageously, the network node determines $P_1$ and $P_2$ such that a total power constraint, i.e. $P_1+P_2 \leq P_{TOTALMAX}$ is met. $P_{TOTALMAX}$ is the maximum allowed transmission power for the wireless device, e.g. UE, at any time instance. That is, also when the UE is only transmitting on one carrier, it cannot use more transmit power than $P_{TOTALMAX}$. The maximum allowed transmission power is typically predefined e.g. in the 3GPP standard, e.g. denoted $P_{MAX}$, and already known to the network. However, it may also be possible for the wireless device to signal this information to the network. With reference to FIG. 4, $P_1+P_2$ may thus be determined or, stated differently, chosen such that the total power transmitted by the wireless device is either on the diagonal line, or below the diagonal line. In two extreme cases, either $P_1$ or $P_2$ is set to equal $P_{TOTALMAX}$, which means that the other value, $P_2$ or $P_1$, will be set to zero. These extreme cases correspond to assigning all the available power to one of the contemporaneous links. This may be done for example if the network node determines that one of the links needs to be prioritized, e.g. because of a high number of HARQ NACKs on that link indicating a low reliability of the link. Other criteria related to a priority of a contemporaneous link could be e.g. the type of traffic carried on the link. This will be described in more detail further below. Of course, it is also possible to assign the power levels in other ways in order to prioritize one of the links, e.g. 80% of the available power could be assigned to the prioritized contemporaneous link, and the rest to the non-prioritized, or at least not as prioritized, contemporaneous link. Another possibility is to assign as much power as needed to the prioritized contemporaneous link, and any remaining power to the non-prioritized contemporaneous link. In a particular variant, one of the links is prioritized during a limited time period.

The separate maximum transmit power values may alternatively be determined such that the sum of all the separate maximum transmit power values $Pmax_i$ does not exceed the maximum allowed transmit power for the wireless device minus a threshold value, i.e. $P_{TOTALMAX}-P_{thresh}$. This threshold value is related to a tolerance value for $P_{TOTALMAX}$, which may be given in standard documents, and be e.g. on the form ±2 dB. When applying the herein suggested technique comprising separate maximum transmit power values for each contemporaneous link, a problem may arise which is related to this tolerance value, if applying this tolerance value to each separate transmit power value independently. Thus the tolerance value should be related to $P_{TOTALMAX}$ When determining the maximum transmission power values, a number of different aspects may be taken into account. For example, the network node may determine the maximum transmission power values based on one or more of: a Power Headroom Report, PHR, from the wireless device, when such a report is available; a Reference Signal Received Power (RSRP), a Reference Signal Received Quality (RSRQ), a buffer status, and a wireless device priority. In the case of PHR or RSRQ, the network node may decide, for example, to allow more transmission power to a certain wireless access point due that the pathloss is higher towards that wireless access point. The maximum transmission power values could be determined based on one or more rules, e.g. from a set of rules. Examples of possible such rules may be e.g. determining a higher transmit power value for a contemporaneous link with a larger corresponding buffer size, as compared to another contemporaneous link; determining a higher transmit power value for a contemporaneous link which has a higher priority, as compared to another contemporaneous link; and/or determining a higher transmit power value for a contemporaneous link having a lower RSRP and/or RSRQ value, as compared to another contemporaneous link.

As previously mentioned, different maximum transmission power levels may be determined, e.g. by an MeNB, not only for different wireless access points associated with the contemporaneous links, but also for different subframes; and/or for different channels and signals. The maximum transmission power levels may for example be determined, or defined, as a repeating pattern over time, wherein the length of the pattern may be arbitrarily long, in principle. As a special case, all available transmission power may be assigned to one of the contemporaneous links for a certain time period, and for the next time period all available transmission power may be assigned to another one of the contemporaneous links. Herein, the expressions time period and time interval may be used interchangeably in this context and may refer to irregular occasions or a single occasion, but also to intervals in a regular pattern. Both are possible within this disclosure.

The time pattern may correspond to that the maximum transmission power value or level is determined based on different criteria during different time periods. In a specific example, one of the links might be prioritized higher than the other links during a certain time period, in which case a higher transmit power level would be set for the higher prioritized link during that time period. The prioritization may be due to the type of traffic being transmitted on the link, e.g. a link carrying real-time traffic may be prioritized higher than other links; or due to buffer size, e.g. a link having more data in the corresponding buffer may be prioritized higher, as previously mentioned. Another possibility is to prioritize a link which currently has a low reliability, which may be detected e.g. due to reception of one or several HARQ NACKs on that link. Other possibilities are to prioritize macro nodes over e.g. pico nodes, to prioritize control information over data transmission. Hence, the criterium which is currently deemed by the network node to be most important to optimize may be applied during a certain time period when determining a separate maximum transmit power value for the wireless device per contemporaneous link.

In one embodiment, the role to determine or define the maximum transmit power values for both MeNB and SeNB(s) may be appointed to an SeNB by an MeNB. This could for example be applicable if the main scheduling is performed from the SeNB. In another embodiment, the MeNB may provide the authority to an SeNB to decide or be in control in a periodic manner. As an example, due to UL traffic, MeNB and SeNB may be in control with certain time scales based on certain criteria, e.g. buffer status.

In embodiments where the network node is a wireless access point, at least one of the obtained maximum transmit power values could further be signaled to the wireless device. Further, in embodiments where the network node is a wireless access point, the network node could schedule the wireless device in the uplink, based on the obtained maximum transmit power value corresponding to the contemporaneous link between the network node and the wireless device. For example, the network node could receive a power headroom report, PHR, from the wireless device; and schedule the wireless device on a contemporaneous link based on the maximum transmit power for that link, and on the received PHR. Further, an actual power headroom available to the wireless device for transmission on one of the contemporaneous links may be determined based on the received PHR and on the obtained maximum transmit power value for that link. This will all be further described below.

The outlined techniques in this disclosure provide the possibility to utilize UL resources in a more flexible way as they enable independent scheduling operation of two or more UL cells when operating in dual- or multi-connectivity mode. Independent scheduling is enabled by determining the appropriate maximum power value for each link on the network side. If a scheduling network node is not aware of which maximum power value that applies for a wireless device configured for contemporaneous communication, e.g. dual connectivity, and if the wireless device itself does not perform any compensation due to the contemporaneous communication, then the network node may need to perform joint scheduling together with other network nodes that are involved in contemporaneous communication with the same wireless device, in order to ensure that the maximum allowed transmit power is not exceeded for the terminal.

It should be noted that the different ways of e.g. determining a separate maximum transmit power value per contemporaneous link, and of assigning priority to one of the contemporaneous links also apply to the other embodiments described herein.

Signalinq Obtained Maximum Transmission Power to Wireless Device

Figure 6:
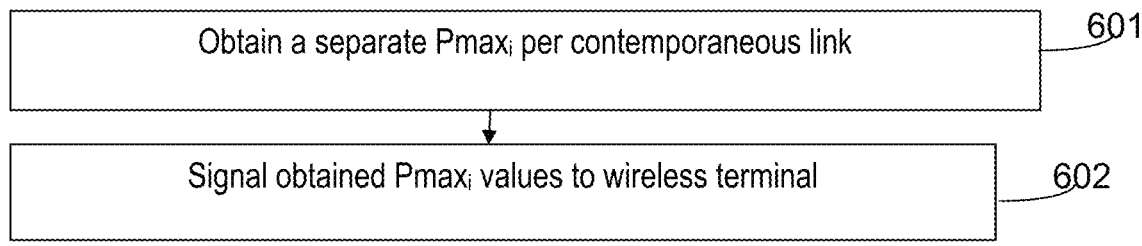

As previously mentioned, a network node could signal the obtained separate maximum transmit power values to a wireless device associated with multiple contemporaneous links. This could be referred to as that the network node configures the wireless device with the separate maximum transmit power values FIG. 6 illustrates an exemplifying embodiment, where a network node obtains 601 a separate maximum transmit power value for a wireless device per contemporaneous link, and signals 602 the separate maximum transmit power values to the wireless device. In this type of embodiments, the network node would be a wireless access point, such as an MeNB or SeNB, or a differently denoted node which is operable to communicate with the wireless device.

The network node may signal the obtained or derived maximum transmission power values, $Pmax_i$, to the wireless device as a Radio Resource Control (RRC) parameter. This RRC parameter can, for example, be signaled as the parameter "P-max" in RRC signaling described in the document 3GPP TS 36.331 v11.5.0 (see also Annex 2) that is considered within the power control formulas when determining the maximum transmission power. In case of two contemporaneous links, only one maximum transmission power value may need to be signaled to the wireless device. In case of more than two contemporaneous links, more than one maximum transmission power value will need to be signaled. Exemplified below is how the wireless device would derive the maximum transmission power for PUSCH, wherein the signaled P-max for the contemporaneous link in question is considered when deriving $P_{CMAX,c}(i)$. The remaining parts of the parameters in the expression below are defined in 3GPP TS 36.213 v11.4.0 (see Annex 1).

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm]$$

In a further exemplification of the embodiment it is possible for the network node to signal a time pattern of a P-max value to the wireless device, with or without information on which channels and signals the value applies to.

Figure 7:
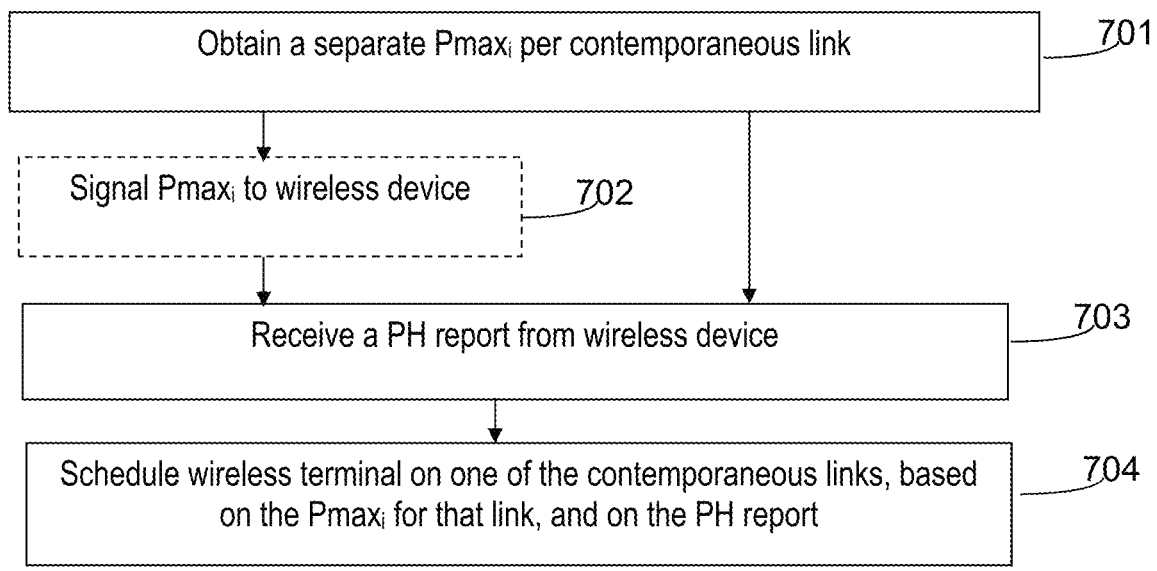
Figure 13:
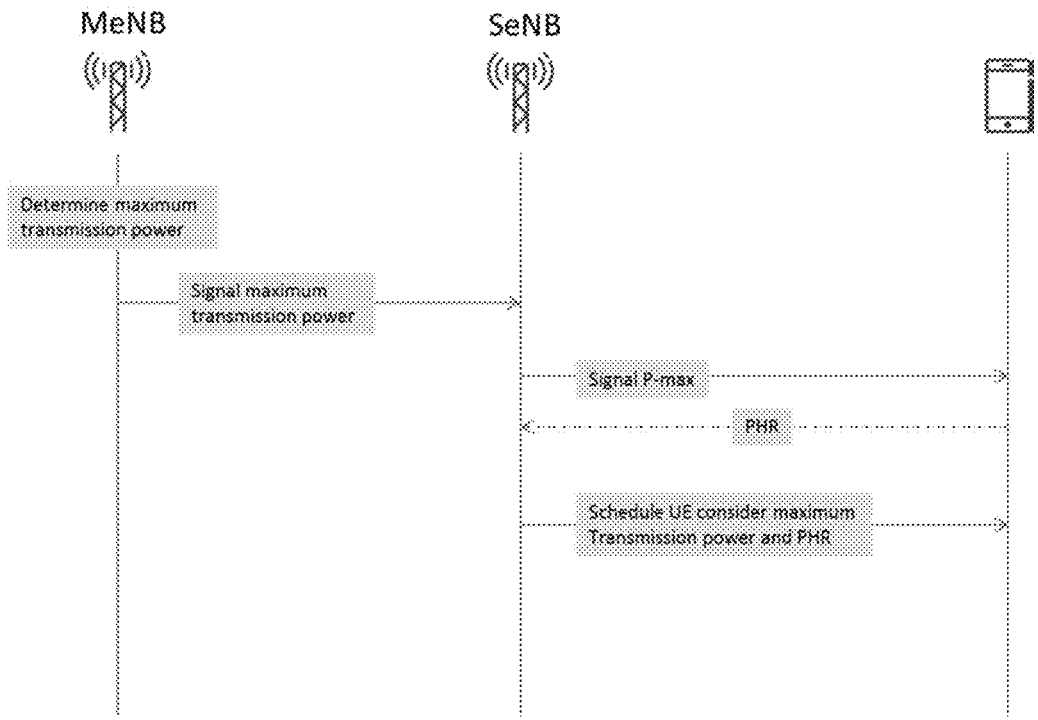

The network node may further receive a power headroom report, PHR, from the wireless device, indicating an available transmission power. When the wireless device has been provided, or configured, with the obtained separate maximum transmit power, the PHR will be based on one or more of these values. FIG. 7 illustrates an embodiment where a network node obtains 701 a separate maximum transmit power value for the wireless device per contemporaneous link, and signals 702 the separate maximum transmit power values to the wireless device. The reason for that action 702 is outlined with a dashed line is that there are possible embodiments where the $Pmax_i$s are not signalled to the wireless device, which will be described further below. The network node further receives 703 a PHR from the wireless device, and schedules 704 the wireless device on a contemporaneous link based on the maximum transmit power value for that link and based on the PHR. As previously mentioned, the PHR will then be derived based on a maximum transmit power value which was signaled to it by the network node. This embodiment is also illustrated in FIG. 13, where the network node which signals the $Pmax_i$ to the wireless device is an SeNB, which in its turn has obtained the $Pmax_i$ from an MeNB.

Network Node Control Over Wireless Device on Ensuring Max Transmit Power Limit

In another embodiment, the obtained maximum transmission power values are not sent to the wireless device. Instead, each scheduling network node needs to ensure that the maximum transmission power allocated to it is not exceeded by the wireless device. The network node can most likely only do this on average as the scheduling network node may not know the current pathloss that the UE observes. Further, there is uncertainness in how the wireless device sets its power, and also in how the wireless device may perform power back offs due to multiple reasons. The power back-offs are usually done by the wireless device to meet requirements related to not causing too much interference on neighboring bands, but there are also other reasons for performing power back-offs. It is, however, typically not known to the network which exact back-off the wireless device utilizes instead only the maximum allowed back-off is specified. Hence, the network can not exactly govern if the UE exceeds the maximum transmission power or not. However, the network can govern or make sure that when excluding these aspects, the wireless device should not exceed the maximum transmission power.

In some embodiments, a network node considers the maximum transmission power for the contemporaneous link in question when assigning an UL grant on PUSCH to a wireless device. In more detail, when the UL grant is determined by the scheduling network node, the maximum transmission power for the contemporaneous link is taken into consideration in selecting the amount of physical resource blocks (PRBs) that a wireless device would be granted, the applicable Modulation and Coding Scheme (MCS) value that a wireless device is given, the transport block size that a wireless device is assigned, on which PRBs the wireless device is assigned, based on which type of resource block and/or assignment type that is selected.

Figure 12:
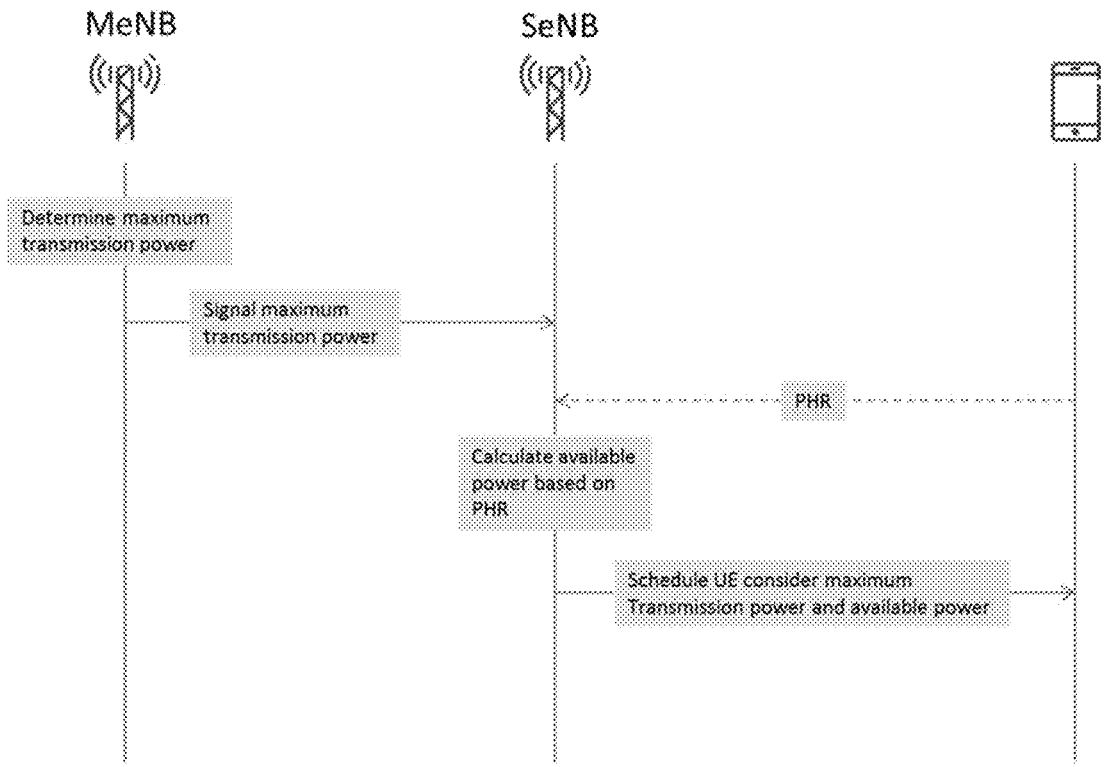
FIGS. 12-13 illustrate signaling between network nodes and a wireless device according to exemplifying embodiments.

To assist the network node in assigning a correct power to the wireless device when it schedules an UL grant, an example is given below in how PHR (Power Headroom Report/ing) can be used. It is assumed further that the network node, e.g. eNB, has received 802 a PHR for at least its "own" link, i.e. the contemporaneous link between the network node and the wireless device. This example is also illustrated in FIG. 8 and in FIG. 12.

Figure 8:
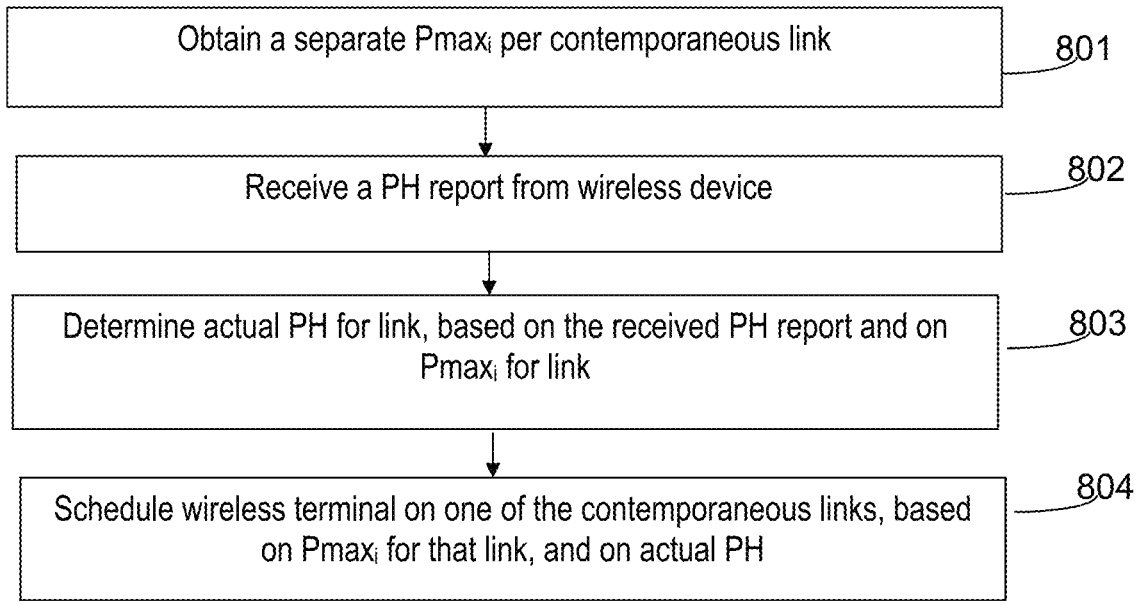

In FIG. 8, the network node obtains 801 a separate $Pmax_i$ per contemporaneous link. These values are in this embodiment not signaled to the wireless device. The network node receives 802 a PHR from the wireless device, which is not based on the $Pmax_i$s, which will be described further below. The network node determines 803 an actual available power headroom, which is available to the wireless device for transmission on one of the contemporaneous links. The power headroom is determined based on the received PHR and on the obtained $Pmax_i$ for that link. The network node then schedules 804 the wireless device based on the $Pmax_i$ and the determined actual power headroom. In FIG. 13, an SeNB receives at least one $Pmax_i$ from an MeNB, and a PHR from a wireless device involved in dual or multi connectivity. The SeNB then determines an actual power headroom for the contemporaneous link between the SeNB and the wireless device and schedules the wireless device on that link based on the $Pmax_i$ for that link and the determined power headroom for that link.

When the network node has not configured the wireless device with a maximum transmission power value corresponding to the network decided value, the PHR will be based on a total power constraint, such as the previously mentioned $P_{TOTALMAX}$. That is, the wireless device may be unaware of the herein disclosed technology, and estimate the power headroom without considering the dual or multi connectivity. The network node would need to translate the PHR report received from the wireless device from being based on a default maximum transmission power value, assumed by the wireless device, to being based on, or reflecting, the separate maximum transmission power for the link, obtained by the network node. Expressed differently, the network node needs to determine the "actual" power headroom for the contemporaneous link based on a power headroom, indicated in the PHR, which is based on a default maximum transmission power value. One way of performing a translation and thus determining an actual power headroom is to determine, i.e. "figure out", the minimum transmission power that the wireless device requires for transmitting a single PRB with a certain modulation in dBm and then compare this to the network-given maximum transmission power value, $Pmax_i$, in dBm. After this comparison the network node will have an internal understanding of the "actual" available power headroom for scheduling on the specific uplink cell, i.e. on the specific contemporaneous link.

The network node may utilize this determined "actual" power headroom value when it performs scheduling and link adaptation e.g. by assigning a specific number of PRBs, Transport Block Size (TBS), modulation etc., such that the UE does not exceeds it maximum transmission power; that is, excluding the above mention uncertainties.

In embodiments where the network node does configure the wireless device with a Pmax value that corresponds to the maximum transmission power value $Pmax_i$ determined by the network, the network node does not need to translate a PHR. Instead, the network node can use the PHR directly when performing scheduling or/and link adaption, particularly in determining the number of PRBs, TBS size, modulation and so on, for the wireless device.

In some variants, a wireless access point that has the priority over another wireless access point in determining the maximum allowed transmission power for a wireless device may use different criteria on different time scales, meaning that for different channels or for different subframes, it may make use of different criteria in the decision process. The different criteria could e.g. be the previously mentioned UL buffer status, pathloss (RSRP), etc.

As mentioned above, as a specific example, different criteria may be applied due to that one of the contemporaneous links is prioritized higher than the other contemporaneous links during a certain time period, in which case a higher transmit power level could be set for the higher prioritized link during that time period. The prioritization may be due to e.g. the type of traffic being transmitted on the link, e.g. a link carrying real-time traffic may be prioritized higher than other links. The priority of a link may alternatively or further be based on a buffer size, where e.g. a link having more data in a corresponding buffer as compared to another link may be prioritized higher, and thus e.g. be allocated a higher transmit power. Another possibility is to prioritize a link which currently has a low reliability, which may be detected e.g. due to reception of one or several HARQ NACKs on that link. Other possibilities are to prioritize macro nodes over e.g. pico nodes, to prioritize control information over data transmission. Hence, the criteria which is currently deemed by the network node to be most important to optimize may be applied during a certain time period.

Signaling Between Wireless Access Points

In another embodiment, when UE is configured for dual connectivity, the eNBs provides the maximum transmission power information to each other. More specifically, the deciding eNB transmits the information via the backhaul or X2.

In another embodiment, similar to the one mentioned under "Signaling derived maximum transmission power to wireless device", the deciding wireless access point signals the maximum allowed transmit power information to the wireless device when the dual connectivity is setup for any wireless device.

In another embodiment, if there are changes in the network information, e.g RSRP received at the wireless access point, etc, then the new maximum transmission power could be signaled to the wireless device when the wireless device is scheduled.

In another embodiment, the signaling between wireless access points and between the wireless access point and wireless device may be provided in a fixed periodic manner, or the signaling from multiple wireless access points to the wireless device may be designed in a TDM manner.

Method in Wireless Device

Some embodiments herein also relate to a method performed by a wireless device configured to support two or more contemporaneous links with two or more corresponding wireless access points. Exemplifying embodiments of a method in a wireless device will be described below with reference to FIGS. 9-10.

Figure 9:
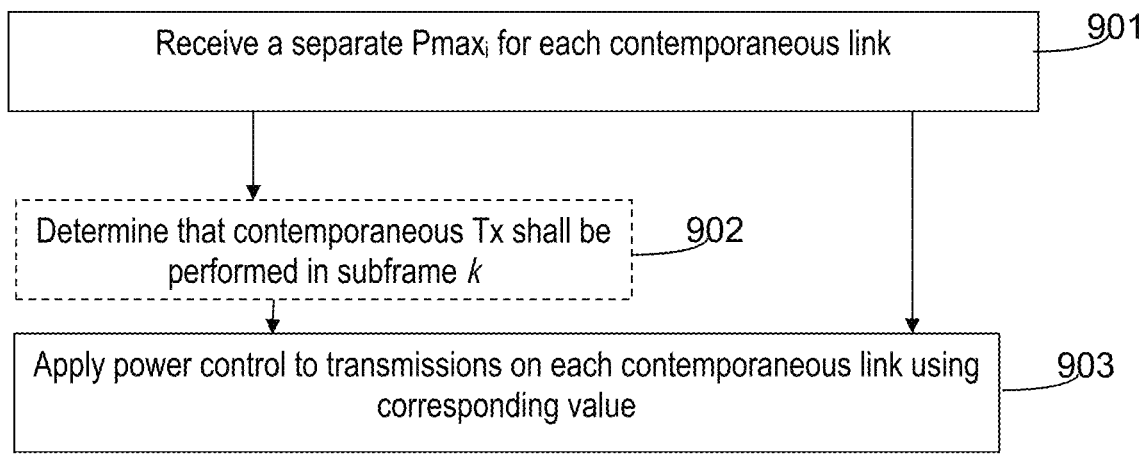
FIGS. 9-10 illustrate procedures in a wireless device, according to exemplifying embodiments.
Figure 10:
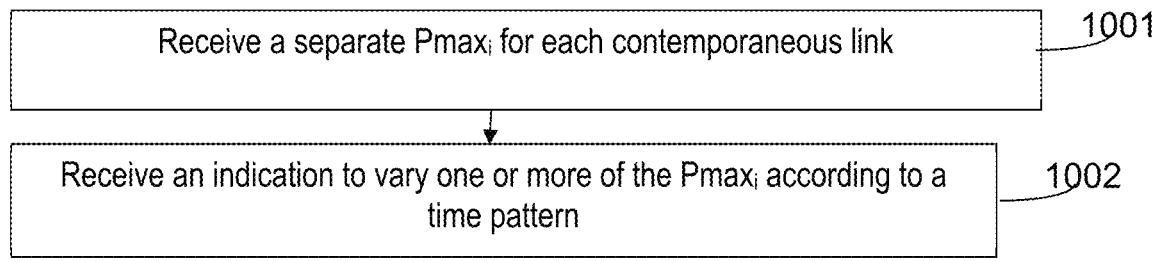
Figure 11A:
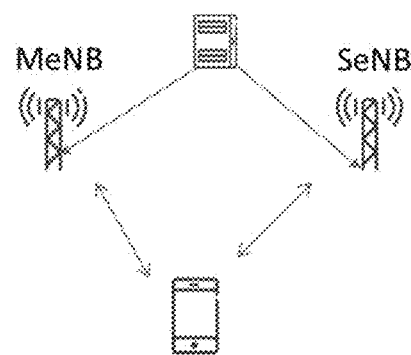
FIG. 11a illustrates a system architecture comprising three network nodes and a wireless device, and further illustrates the communication between them, according to an exemplifying embodiment.
Figure 11B:
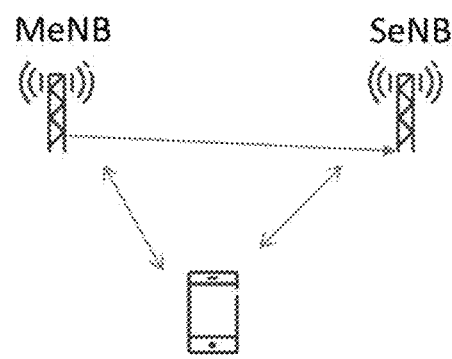
FIG. 11b illustrates a system architecture comprising two network nodes and a wireless device, and further illustrates the communication between them, according to an exemplifying embodiment.

According to an exemplifying method embodiment illustrated in FIG. 9, the wireless device receives 901 a separate maximum transmit power value for each contemporaneous link; and applies 903 power control to transmissions on each contemporaneous link based on the maximum transmit power value corresponding to the respective link. Apart from actual implementation of determined power control parameters, apply power control could e.g. comprise determining power headroom values per contemporaneous link based on the received separate maximum power transmit values. The wireless device could further provide a respective determined power headroom value to the respective wireless access points with which it is involved in dual or multi connectivity.

In some embodiments, the wireless device may further receive 1002 an indication from a network node to vary one or more of the maximum transmit power values according to a time pattern. The wireless device may then apply power control to transmissions on the corresponding link or links according to the time pattern. That is, the method comprises receiving 1001 a separate maximum transmit power value for each contemporaneous link, and receiving 1002 an indication to vary one or more of the maximum transmit power values according to a time pattern.

In a variant, which is also illustrated with a dashed outline in FIG. 9, the wireless device further determines 902 that contemporaneous transmission will be performed based on having received more than one uplink grant with respect to a subframe k, and applies power control to transmissions on each contemporaneous link in subframe k using the maximum transmit power value for that link.

A further embodiment provides a method performed in a wireless device configured to support two or more contemporaneous links with two or more corresponding wireless access points. The method comprises receiving a separate maximum transmit power value for the wireless device for each contemporaneous link, and receiving an indication to vary one or more of the maximum transmit power values according to a time pattern.

Hardware Implementations

Network Node

Figure 14:
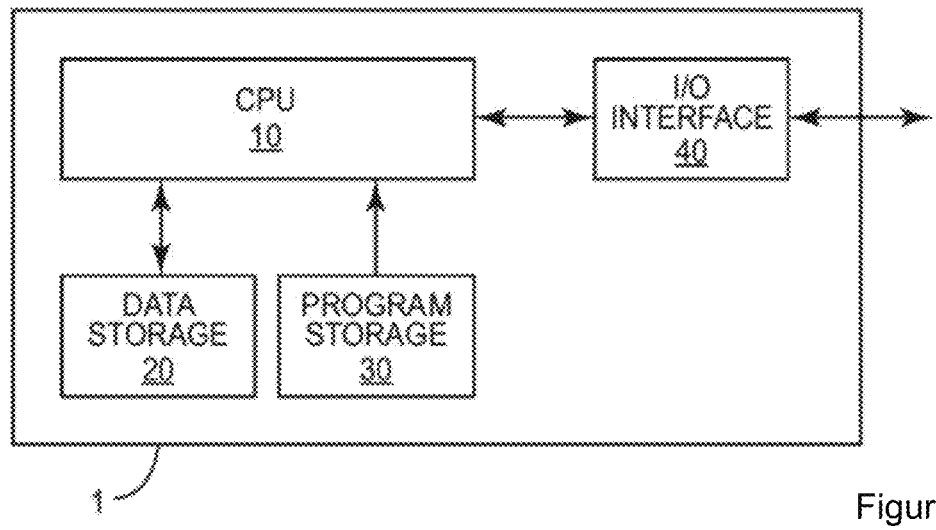
FIGS. 14-16 show a Network Node according to exemplifying embodiments.

Several of the techniques and processes described above can be implemented in a network node, such as an eNB or other node in a 3GPP network. FIG. 14 is a schematic illustration of a network node 1 in which a method embodying any of the presently described network-based techniques can be implemented. A computer program for controlling the node 1 to carry out a method embodying the present invention is stored in a program storage 30, which comprises one or several memory devices. Data used during the performance of a method embodying the present invention is stored in a data storage 20, which also comprises one or more memory devices. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which includes a network interface for sending and receiving data to and from other network nodes and which may also include a radio transceiver for communicating with one or more terminals.

Accordingly, in various embodiments of the invention, processing circuits, such as the CPU 10 and memory circuits 20 and 30 in FIG. 14, are configured to carry out one or more of the techniques described in detail above. Likewise, other embodiments may include base stations and/or radio network controllers that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 15:
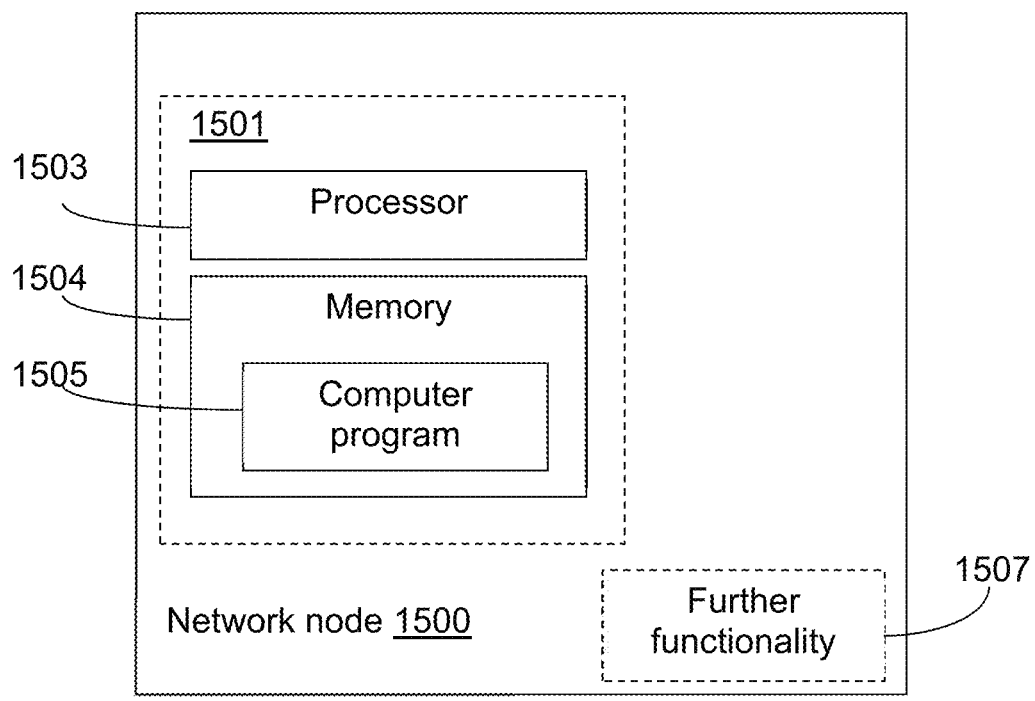

An exemplifying embodiment of a network node is illustrated in a general manner in FIG. 15. The network node 1500 is configured to perform at least one of the method embodiments described above with reference to any of FIGS. 5-8 or 11-13. The network node 1500 is associated with the same technical features, objects and advantages as the previously described method embodiments. The node will be described in brief in order to avoid unnecessary repetition.

The part of the network node 1500 which is most affected by the adaptation to the herein described solution is illustrated as an arrangement 1501, surrounded by a dashed line. The network node 1500 or arrangement 1501 may be assumed to comprise further functionality 1506, for carrying out regular node functions. These functions would be at least partly different depending on whether the network node is a wireless access point or a node on a higher hierarchical level in the wireless communication network.

The network node or the arrangement part of the network node may be implemented and/or described as follows:

The network node 1500 comprises processing means 1503, such as a processor, and a memory 1504 for storing instructions, the memory comprising instructions, e.g. computer program 1505, which when executed by the processing means causes the network node 1500 or arrangement 1501 to obtain a separate maximum transmit power value for a wireless device per contemporaneous link. The execution of the instructions further causes the network node to transmit at least one of the obtained maximum transmit power values to another network node. Alternatively, or in addition, the execution of the instructions may cause the network node to signal the separate maximum transmit power values to the wireless device; and/or to receive a power headroom report from the wireless device, and schedule the wireless device on one of the contemporaneous links, based on the obtained maximum transmit power value for that link, and e.g. on the received power headroom report.

Figure 16:
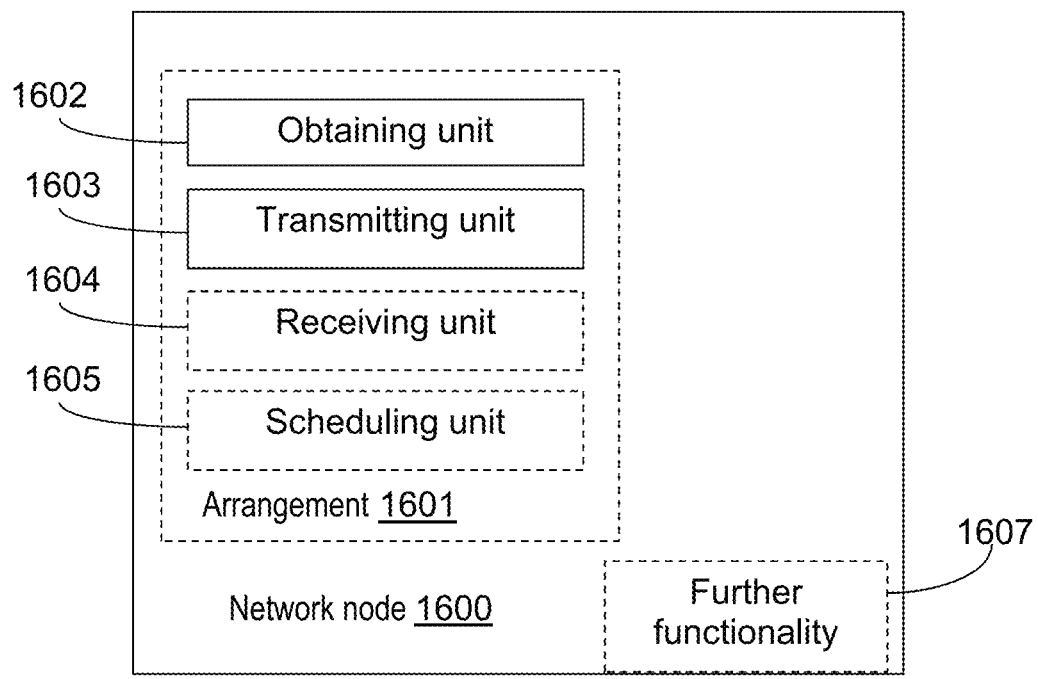

An alternative implementation of the network node 1500 is shown in FIG. 16. The network node 1600 or arrangement 1601 comprises an obtaining unit 1602, configured to obtain a separate maximum transmit power value for a wireless device per contemporaneous link. The network node further comprises a transmitting unit 1603, configured transmit at least one of the obtained maximum transmit power values to another network node.

The network nodes described above could be configured for the different method embodiments described herein. For example, the network node 1600 could comprise a receiving unit 1604 configured to receive a power headroom report from the wireless device, and a scheduling unit 1605, configured for scheduling the wireless device on one of the contemporaneous links, based on the obtained maximum transmit power value for that link, and e.g. on the received power headroom report.

Wireless Device

Figure 17:
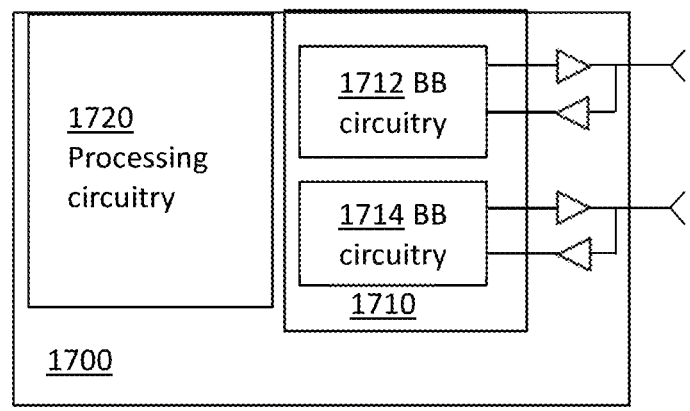
FIGS. 17-19 show a wireless device according to exemplifying embodiments.

Similarly, several of the techniques and methods described above may be implemented using radio circuitry and electronic data processing circuitry provided in a wireless device. FIG. 17 illustrates features of an example wireless device 1700 according to several embodiments presented herein. Wireless device 1700, which may be a UE configured for dual-connectivity operation with an LTE network (E-UTRAN), for example, comprises digital signal processing circuitry 1510, which in turn comprises baseband circuitry 1712 and 1714. Baseband circuitry 1712 and 1714 are each connected to one or more power amplifiers each coupled to one or more transmit/receive antennas. Hence, the mobile terminal is able to perform contemporaneous communication with two or more wireless access points by means of separate transmit/receive circuitry. Although FIG. 17 shows the same antenna being used for transmission and reception, separate receive and transmit antennas are also possible. The mobile terminal 1700 further comprises processing circuitry 1720 for processing the transmitted and received signals. Note also that digital processing circuitry 1710 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas: while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Figure 18:
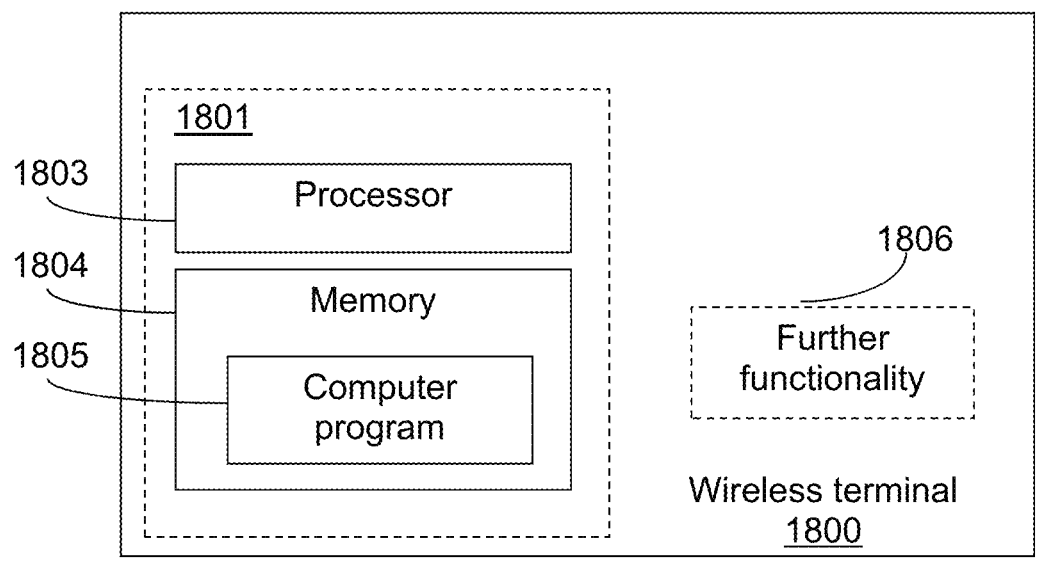

An exemplifying embodiment of a wireless device is illustrated in a general manner in FIG. 18. The wireless device 1800 is configured to perform at least one of the method embodiments for a wireless device described above with reference to any of FIGS. 9-13. The wireless device 1800 is associated with the same technical features, objects and advantages as the previously described method embodiments for a wireless device. The terminal will be described in brief in order to avoid unnecessary repetition.

The part of the wireless device 1800 which is most affected by the adaptation to the herein described solution is illustrated as an arrangement 1801, surrounded by a dashed line. The wireless device 1800 or arrangement 1801 may be assumed to comprise further functionality 1806, for carrying out regular terminal functions.

Figure 19:
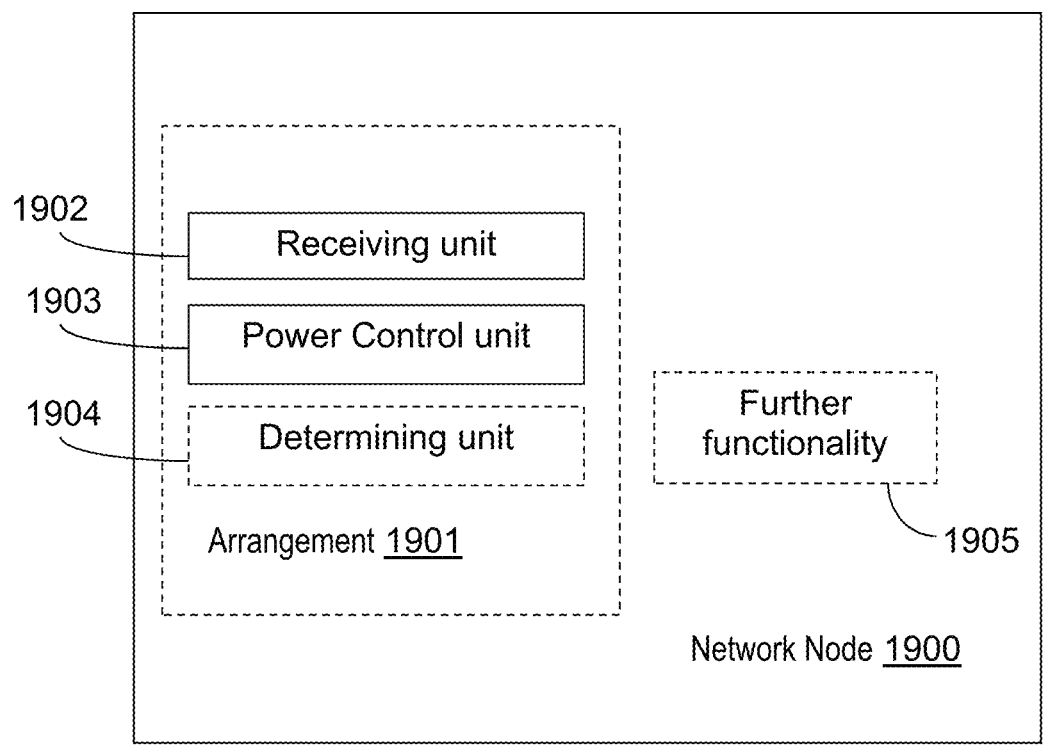

The wireless device or the arrangement part of the wireless device may be implemented and/or described as follows:

The wireless device 1800 comprises processing means 1803, such as a processor, and a memory 1804 for storing instructions, the memory comprising instructions, e.g. computer program 1805, which when executed by the processing means causes the network node 1800 or arrangement 1801 to receive a separate maximum transmit power value, for the wireless device, for each contemporaneous link. The execution of the instructions further causes the wireless device to apply power control to transmissions on each contemporaneous link based on the maximum transmit power value corresponding to the respective link. The execution of the instructions may further cause the wireless device to receive an indication to vary one or more of the maximum transmit power values according to a time pattern An alternative implementation of the network node 1800 is shown in FIG. 19. The wireless device 1900 or arrangement 1901 comprises a receiving unit 1902, configured to receive a separate maximum transmit power value for each contemporaneous link. The wireless device further comprises a power control unit 1903, configured to apply power control to transmissions on each contemporaneous link based on the maximum transmit power value corresponding to the respective link.

The wireless device embodiments described above could be configured for the different method embodiments described herein. For example, the receiving unit 1902 could be further configured to receive an indication to vary one or more of the maximum transmit power values according to a time pattern. The wireless device 1900 could further comprise a determining unit 1904 configured to determine that contemporaneous transmission will be, or is to be, performed, based on having received more than one uplink grant with respect to a subframe k.

Processing circuitry 1720 or 1803 may comprise one or more processors coupled to one or more memory devices that make up a data storage memory and a program storage memory. The processor(s) may be a microprocessor, microcontroller, or digital signal processor, in some embodiments. More generally, processing circuitry 1720 may comprise a processor/firmware combination, or specialized digital hardware, or a combination thereof. The memory may comprise one or several types of memory such as read-only memory (ROM), random-access memory, cache memory, flash memory devices, optical storage devices, etc. Again, because the various details and engineering tradeoffs associated with the design of baseband processing circuitry for mobile devices are well known and are unnecessary to a full understanding of the invention, additional details are not shown here.

Typical functions of the processing circuitry 1720 or of the further functionality 1507 or 1607 include modulation and coding of transmitted signals and the demodulation and decoding of received signals. In several embodiments of the present invention, processing circuit 1720 is adapted, using suitable program code stored in a program storage memory, for example, to carry out one of the techniques described above for controlling transmit power. Of course, it will be appreciated that not all of the steps of these techniques are necessarily performed in a single microprocessor or even in a single module.

The units or modules in the arrangements in the respective different network node embodiments and wireless device embodiments described above could be implemented e.g. by one or more of: a processor or a microprocessor and adequate software and memory for storing thereof, a Programmable Logic Device (PLD) or other electronic component(s) or processing circuitry configured to perform the actions described above, and illustrated e.g. in FIGS. 5-10. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should be noted that although terminology from 3GPP LTE has been used in this disclosure to exemplify the invention, this should not be seen as limiting the scope of the invention to only the aforementioned system. Other wireless systems which support contemporaneous connections with two or more wireless access points, e.g. dual connectivity, may also benefit from exploiting the ideas covered within this disclosure.

When using the word "comprise" or "comprising" it shall be interpreted as non-limiting, i.e. meaning "consist at least of".

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments.

Abbreviations
3GPP 3rd Generation Partnership Project
DFT Discrete Fourier Transform
eNB or
eNodeB Enhanced Node B
E-UTRAN Evolved Universal Terrestrial Access Network
FDD Frequency Division Duplex
LTE Long Term Evolution
OFDM Orthogonal Frequency Division Multiplexing
PHR Power Headroom Report/ing
PUCCH Physical Uplink Control Channel
PUSCH Physical Uplink Shared Channel
TDD Time Division Duplex
UMTS Universal Mobile Telecommunication System
Annex 1: Excerpts from 3GPP TS 36.213, v11.4.0
5.1 Uplink Power Control Uplink power control controls the transmit power of the different uplink physical channels.

For PUSCH, the transmit power $\hat{P}_{PUSCH,c}(i)$ defined in clause 5.1.1, is first scaled by the ratio of the number of antennas ports with a non-zero PUSCH transmission to the number of configured antenna ports for the transmission scheme. The resulting scaled power is then split equally across the antenna ports on which the non-zero PUSCH is transmitted.

For PUCCH or SRS, the transmit power $\hat{P}_{PUCCH}(i)$, defined in clause 5.1.1.1, or $\hat{P}_{SRS,c}(i)$ is split equally across the configured antenna ports for PUCCH or SRS. $\hat{P}_{SRS,c}(i)$ is the linear value of $P_{SRS,c}(i)$ defined in clause 5.1.3.

A cell wide overload indicator (OI) and a High Interference Indicator (HII) to control UL interference are defined in [9].

5.1.1 Physical Uplink Shared Channel
5.1.1.1 UE Behaviour

The setting of the UE Transmit power for a Physical Uplink Shared Channel (PUSCH) transmission is defined as follows.

If the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min\left\{\begin{array}{l}P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i)\end{array}\right\} [dBm]$$

If the UE transmits PUSCH simultaneous with PUCCH for the serving cell c, then the UE transmit power $P_{PUSCH,c}(i)$ for the PUSCH transmission in subframe i for the serving cell c is given by $$P_{PUSCH,c}(i) = \min\left\{\begin{array}{l}10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i)\end{array}\right\} [dBm]$$

If the UE is not transmitting PUSCH for the serving cell c, for the accumulation of TPC command received with DCI format 3/3A for PUSCH, the UE shall assume that the UE transmit power $P_{PUSCH,c}(i)$ for the PUSCH transmission in subframe i for the serving cell c is computed by $$P_{PUSCH,c}(i) = \min\{P_{CMAX,c}(i), P_{O\_PUSCH,c}(l) + \alpha_c(l) \cdot PL_c + f_c(i)\} \quad [dBm]$$

where,
$P_{CMAX,c}(i)$ is the configured UE transmit power defined in [6] in subframe i for serving cell c and $\hat{P}_{CMAX,c}(i)$ is the linear value of $P_{CMAX,c}(i)$. If the UE transmits PUCCH without PUSCH in subframe i for the serving cell c, for the accumulation of TPC command received with DCI format 3/3A for PUSCH, the UE shall assume $P_{CMAX,c}(i)$ as given by clause 5.1.2.1. If the UE does not transmit PUCCH and PUSCH in subframe i for the serving cell c, for the accumulation of TPC command received with DCI format 3/3A for PUSCH, the UE shall compute $P_{CMAX,c}(i)$ assuming MPR=0 dB, A-MPR=0 dB, P-MPR=0 dB and $\Delta T_C$=0 dB, where MPR, A-MPR, P-MPR and $\Delta T_C$ are defined in [6].

$\hat{P}_{PUCCH}(i)$ is the linear value of $P_{PUCCH}(i)$ defined in clause 5.1.2.1

$M_{PUSCH,c}(i)$ is the bandwidth of the PUSCH resource assignment expressed in number of resource blocks valid for subframe i and serving cell c.

$P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower [8] ($P_{O\_PRE}$) and $\Delta_{PREAMBLE\_Msg3}$ are signalled from higher layers for serving cell c.

For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j)=1$.

$PL_c$ is the downlink pathloss estimate calculated in the UE for serving cell c in dB and $PL_c$= referenceSignalPower−higher layer filtered RSRP, where referenceSignalPower is provided by higher layers and RSRP is defined in [5] for the reference serving cell and the higher layer filter configuration is defined in [11] for the reference serving cell. If serving cell c belongs to a TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking defined in [11] is used as the reference serving cell for determining referenceSignalPower and higher layer filtered RSRP. If serving cell c belongs to a TAG not containing the primary cell then serving cell c is used as the reference serving cell for determining referenceSignalPower and higher layer filtered RSRP.

$\Delta_{TF,c}(i)=10\log_{10}((2^{BPRE \cdot K_s}-1) \cdot \beta_{offset}^{PUSCH})$ for $K_s$=1.25 and 0 for $K_s$=0 where $K_s$ is given by the parameter deltaMCS-Enabled provided by higher layers for each serving cell c. BPRE and $\beta_{offset}^{PUSCH}$, for each serving cell c, are computed as below. $K_s$=0 for transmission mode 2.

BPRE=$O_{CQI}/N_{RE}$ for control data sent via PUSCH without UL-SCH data and $$\sum_{r=0}^{C-1} K_r / N_{RE}$$

for other cases.

where C is the number of code blocks, $K_r$ is the size for code block r, $O_{CQI}$ is the number of CQI/PMI bits including CRC bits and NRE is the number of resource elements determined as $N_{RE}= M_{sc}^{PUSCH\text{-}initial} \cdot N_{symb}^{PUSCH\text{-}initial}$, where C, $K_r$, $M_{sc}^{PUSCH\text{-}initial}$ and $N_{symb}^{PUSCH\text{-}initial}$ are defined in [4].

$\beta\beta_{offset}^{PUSCH}=\beta_{offset}^{CQI}$ for control data sent via PUSCH without UL-SCH data and 1 for other cases.

$\delta_{PUSCH,c}$ is a correction value, also referred to as a TPC command and is included in PDCCH/EPDCCH with DCI format 0/4 for serving cell c or jointly coded with other TPC commands in PDCCH with DCI format 3/3A whose CRC parity bits are scrambled with TPC-PUSCH-RNTI. The current PUSCH power control adjustment state for serving cell c is given by $f_c(i)$ which is defined by:

$f_c(i)=f_c(i-1)+\delta_{PUSCH,c}(i-K_{PUSCH})$ if accumulation is enabled based on the parameter Accumulation-enabled provided by higher layers or if the TPC command $\delta_{PUSCH,c}$ is included in a PDCCH/EPDCCH with DCI format 0 for serving cell c where the CRC is scrambled by the Temporary C-RNTI where $\delta_{PUSCH,c}(i-K_{PUSCH})$ was signalled on PDCCH/EPDCCH with DCI format 0/4 or PDCCH with DCI format 3/3A on subframe $i-K_{PUSCH}$, and where $f_c(0)$ is the first value after reset of accumulation.

The value of $K_{PUSCH}$ is

For FDD, $K_{PUSCH}$=4

For TDD, if the UE is configured with more than one serving cell and the TDD UL/DL configuration of at least two configured serving cells is not the same, the "TDD UL/DL configuration" refers to the UL-reference UL/DL configuration (defined in clause 8.0) for serving cell c.

For TDD UL/DL configurations 1-6, $K_{PUSCH}$ is given in Table 5.1.1.1-1

For TDD UL/DL configuration 0

If the PUSCH transmission in subframe 2 or 7 is scheduled with a PDCCH/EPDCCH of DCI format 0/4 in which the LSB of the UL index is set to 1, $K_{PUSCH}$=7

For all other PUSCH transmissions, $K_{PUSCH}$ is given in Table 5.1.1.1-1.

For serving cell c the UE attempts to decode a PDCCH/EPDCCH of DCI format 0/4 with the UE's C-RNTI or DCI format 0 for SPS C-RNTI and a PDCCH of DCI format 3/3A with this UE's TPC-PUSCH-RNTI in every subframe except when in DRX or where serving cell c is deactivated.

If DCI format 0/4 for serving cell c and DCI format 3/3A are both detected in the same subframe, then the UE shall use the $\delta_{PUSCH,c}$ provided in DCI format 0/4.

$\delta_{PUSCH,c}$=0 dB for a subframe where no TPC command is decoded for serving cell c or where DRX occurs or i is not an uplink subframe in TDD.

The $\delta_{PUSCH,c}$ dB accumulated values signalled on PDCCH/EPDCCH with DCI format 0/4 are given in Table 5.1.1.1-2. If the PDCCH/EPDCCH with DCI format 0 is validated as a SPS activation or release PDCCH/EPDCCH, then $\delta_{PUSCH,c}$ is 0 dB.

The $\delta_{PUSCH}$ dB accumulated values signalled on PDCCH with DCI format 3/3A are one of SET1 given in Table 5.1.1.1-2 or SET2 given in Table 5.1.1.1-3 as determined by the parameter TPC-Index provided by higher layers.

If UE has reached $P_{CMAX,c}(i)$ for serving cell c, positive TPC commands for serving cell c shall not be accumulated If UE has reached minimum power, negative TPC commands shall not be accumulated UE shall reset accumulation
  For serving cell c, when $P_{O\_UE\_PUSCH,c}$ value is changed by higher layers
  For serving cell c, when the UE receives random access response message for serving cell c
$f_c(i)=\delta_{PUSCH,c}(i-K_{PUSCH})$ if accumulation is not enabled for serving cell c based on the parameter Accumulation-enabled provided by higher layers where $\delta_{PUSCH,c}(i-KPUSCH)$ was signalled on PDCCH/EPDCCH with DCI format 0/4 for serving cell c on subframe $i-K_{PUSCH}$ The value of $K_{PUSCH}$ is
  For FDD, $K_{PUSCH}=4$
  For TDD, if the UE is configured with more than one serving cell and the TDD UL/DL configuration of at least two configured serving cells is not the same, the "TDD UL/DL configuration" refers to the UL-reference UL/DL configuration (defined in clause 8.0) for serving cell c.
  For TDD UL/DL configurations 1-6, $K_{PUSCH}$ is given in Table 5.1.1.1-1.
  For TDD UL/DL configuration 0
    If the PUSCH transmission in subframe 2 or 7 is scheduled with a PDCCH/EPDCCH of DCI format 0/4 in which the LSB of the UL index is set to 1, $K_{PUSCH}=7$
    For all other PUSCH transmissions, $K_{PUSCH}$ is given in Table 5.1.1.1-1.

The $\delta_{PUSCH,c}$ dB absolute values signalled on PDCCH/EPDCCH with DCI format 0/4 are given in Table 5.1.1.1-2. If the PDCCH/EPDCCH with DCI format 0 is validated as a SPS activation or release PDCCH/EPDCCH, then $\delta_{PUSCH,c}$ is 0 dB.

$f_c(i)=f_c(i-1)$ for a subframe where no PDCCH/EPDCCH with DCI format 0/4 is decoded for serving cell c or where DRX occurs or i is not an uplink subframe in TDD.

For both types of $f_c(*)$ (accumulation or current absolute) the first value is set as follows:
  If $P_{O\_UE\_PUSCH,c}$ value is changed by higher layers and serving cell c is the primary cell or, if $P_{O\_UE\_PUSCH,c}$ value is received by higher layers and serving cell c is a Secondary cell
    $f_c(0)=0$
  Else
    If the UE receives the random access response message for a serving cell c
      $f_c(0)=\Delta P_{rampup,c}+\delta_{msg2,c}$, where
      $\delta_{msg2,c}$ is the TPC command indicated in the random access response corresponding to the random access preamble transmitted in the serving cell c, see clause 6.2, and $$\Delta P_{rampup,c} = \min\left\{\left[\max\left(0, P_{CMAX,c} - \left(\begin{array}{c}10\log_{10}(M_{PUSCH,c}(0)) + \\ P_{O\_PUSCH,c}(2) + \delta_{msg2} + \\ \alpha_c(2)\cdot PL + \Delta_{TF,c}(0)\end{array}\right)\right)\right]\Delta P_{rampuprequested,c}\right\}$$

and $\Delta P_{rampuprequested,c}$ is provided by higher layers and corresponds to the total power ramp-up requested by higher layers from the first to the last preamble in the serving cell c, $M_{PUSCH,c}(0)$ is the bandwidth of the PUSCH resource assignment expressed in number of resource blocks valid for the subframe of first PUSCH transmission in the serving cell c, and $\Delta_{TF,c}(0)$ is the power adjustment of first PUSCH transmission in the serving cell c.

TABLE 5.1.1.1-1

$K_{PUSCH}$ for TDD configuration 0-6

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

TABLE 5.1.1.1-2

Mapping of TPC Command Field in DCI format 0/3/4 to absolute and accumulated $\delta_{PUSCH,c}$ values

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 5.1.1.1-3

Mapping of TPC Command Field in DCI format 3A to accumulated $\delta_{PUSCH,c}$ values

| TPC Command Field in DCI format 3A | Accumulated $\delta_{PUSCH,c}$ [dB] |
|---|---|
| 0 | −1 |
| 1 | 1 |

If the total transmit power of the UE would exceed $\hat{P}_{CMAX}(i)$, the UE scales $\hat{P}_{PUSCH,c}(i)$ for the serving cell c in subframe i such that the condition $$\sum_c w(i)\cdot \hat{P}_{PUSCH,c}(i) \leq (\hat{P}_{CMAX}(i) - \hat{P}_{PUCCH}(i))$$

is satisfied where $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ defined in [6] in subframe i and w(i) is a scaling factor of $\hat{P}_{PUSCH,c}(i)$ for serving cell c where $0\leq w(i)\leq 1$. In case there is no PUCCH transmission in subframe i $\hat{P}_{PUCCH}(i)=0$.

If the UE has PUSCH transmission with UCI on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe i such that the condition $$\sum_{c \neq j} w(i) \cdot \hat{P}_{PUSCH,c}(i) \leq (\hat{P}_{CMAX}(i) - \hat{P}_{PUSCH,j}(i))$$

is satisfied where $\hat{P}_{PUSCH,j}(i)$ is the PUSCH transmit power for the cell with UCI and $w(i)$ is a scaling factor of $\hat{P}_{PUSCH,c}(i)$ for serving cell c without UCI. In this case, no power scaling is applied to $\hat{P}_{PUSCH,j}(i)$ unless $$\sum_{c \neq j} w(i) \cdot \hat{P}_{PUSCH,c}(i) = 0$$

and the total transmit power of the UE still would exceed $\hat{P}_{CMAX}(i)$.

Note that $w(i)$ values are the same across serving cells when $w(i)>0$ but for certain serving cells $w(i)$ may be zero.

If the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i)))$$

and $$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG the UE shall adjust its total transmission power to not exceed $P_{CMAX}$ on any overlapped portion.

If the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG the UE shall adjust its total transmission power to not exceed $P_{CMAX}$ on any overlapped portion.

If the UE is configured with multiple TAGs, and if the SRS transmission of the UE in a symbol on subframe i for a given serving cell in a TAG overlaps with the PUCCH/PUSCH transmission on subframe i or subframe i+1 for a different serving cell in the same or another TAG the UE shall drop SRS if its total transmission power exceeds $P_{CMAX}$ on any overlapped portion of the symbol.

If the UE is configured with multiple TAGs and more than 2 serving cells, and if the SRS transmission of the UE in a symbol on subframe I for a given serving cell overlaps with the SRS transmission on subframe i for a different serving cell(s) and with PUSCH/PUCCH transmission on subframe i or subframe i+1 for another serving cell(s) the UE shall drop the SRS transmissions if the total transmission power exceeds $P_{CMAX}$ on any overlapped portion of the symbol.

If the UE is configured with multiple TAGs, the UE shall, when requested by higher layers, to transmit PRACH in a secondary serving cell in parallel with SRS transmission in a symbol on a subframe of a different serving cell belonging to a different TAG, drop SRS if the total transmission power exceeds $P_{CMAX}$ on any overlapped portion in the symbol.

If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

5.1.1.2 Power Headroom

There are two types of UE power headroom reports defined. A UE power headroom PH is valid for subframe i for serving cell c.

Type 1:

If the UE transmits PUSCH without PUCCH in subframe i for serving cell c, power headroom for a Type 1 report is computed using $$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \quad [dB]$$

where, $P_{CMAX,c}(i)$, $M_{PUSCH,c}(i)$, $P_{O\_PUSCH,c}(j)$, $\alpha_c(j)$, $PL_c$, $\Delta_{TF,c}(i)$ and $f_c(i)$ are defined in clause 5.1.1.1.

If the UE transmits PUSCH with PUCCH in subframe i for serving cell c, power headroom for a Type 1 report is computed using $$PH_{type1,c}(i) = \tilde{P}_{CMAX,c}(i) - \{10 \log_{10}(M_{PUSCH,c}(i)) + P_{O\_PUSCH,c}(\ ) + \alpha_c(j) \cdot PL_c + \Delta_{TF,c}(i) + f_c(i)\} \quad [dB]$$

where, $M_{PUSCH,c}(i)$, $P_{O\_PUSCH,c}(j)$, $\alpha_c(j)$, $PL_c$, $\Delta_{TF,c}(i)$ and $f_c(i)$ are defined in clause 5.1.1.1. $\tilde{P}_{CMAX,c}(i)$ is computed based on the requirements in [6] assuming a PUSCH only transmission in subframe i. For this case, the physical layer delivers $\tilde{P}_{CMAX,c}(i)$ instead of $P_{CMAX,c}(i)$ to higher layers.

If the UE does not transmit PUSCH in subframe i for serving cell c, power headroom for a Type 1 report is computed using $$PH_{type1,c}(i) = \tilde{P}_{CMAX,c}(i) - \{P_{O\_PUSCH,c}(1) + \alpha_c(1) \cdot PL_c + f_c(i)\} \quad [dB]$$

where, $\tilde{P}_{CMAX,c}(i)$ is computed assuming MPR=0 dB, A-MPR=0 dB, P-MPR=0 dB and $\Delta T_C$=0 dB, where MPR, A-MPR, P-MPR and $\Delta T_C$ are defined in [6]. $P_{O\_PUSCH,c}(1)$, $\alpha_c(1)$, $PL_c$, and $f_c(i)$ are defined in clause 5.1.1.1.

Type 2:

If the UE transmits PUSCH simultaneous with PUCCH in subframe i for the primary cell, power headroom for a Type 2 report is computed using $$PH_{type2}(i) = P_{CMAX,c}(i) - 10\log_{10}\left( 10^{\left(\frac{10\log_{10}(M_{PUSCH,c}(i)) + P_{O\_PUSCH,c}(j) + \alpha_c(j) \cdot PL_c + \Delta_{TF,c}(i) + f_c(i)}{10}\right)} + 10^{\left(\frac{P_{O\_PUCCH} + PL_c + h(n_{CQI}, n_{HARQ}, n_{SR}) + \Delta_{F\_PUCCH}(F) + \Delta_{TxD}(F') + g(i)}{10}\right)} \right) \quad [dB]$$

where, $P_{CMAX,c}$, $M_{PUSCH,c}(i)$, $P_{O\_PUSCH,c}(j)$, $\alpha_c(j)$, $\Delta_{TF,c}(i)$ and $f_c(i)$ are the primary cell parameters as defined in clause 5.1.1.1 and $P_{O\_PUCCH}$, $PL_c$, $h(n_{CQI}, n_{HARQ}, n_{SR})$, $A_{F\_PUCCH}(F)$, $\Delta_{TxD}(F')$ and $g(i)$ are defined in clause 5.1.2.1

If the UE transmits PUSCH without PUCCH in subframe i for the primary cell, power headroom for a Type 2 report is computed using $$PH_{type2}(i) = P_{CMAX,c}(i) - 10\log_{10}\left(10^{\left(10\log_{10}(M_{PUSCH,c}(i))+P_{O\_PUSCH,c}(j)+\alpha_c(j)\cdot PL_c+\Delta_{TF,c}(i)+f_c(i)\right)/10} + 10^{(P_{O\_PUCCH}+PL_c+g(i))/10}\right)$$ [dB]

where, $P_{CMAX,c}(i)$, $M_{PUSCH,c}(i)$ $P_{O\_PUSCH,c}(j)$, $\alpha_c(j)$, $\Delta_{TF,c}(i)$ and $f_c(i)$ are the primary cell parameters as defined in clause 5.1.1.1 and $P_{O\_PUCCH}$, $PL_c$ and $g(i)$ are defined in clause 5.1.2.1.

If the UE transmits PUCCH without PUSCH in subframe i for the primary cell, power headroom for a Type 2 report is computed using $$PH_{type2}(i) = P_{CMAX,c}(i) - 10\log_{10}\left(10^{(P_{O\_PUSCH,c}(1)+\alpha_c(1)\cdot PL_c+f_c(i))/10} + 10^{\left(P_{0\_PUCCH}+PL_c+h(n_{CQI},n_{HARQ},n_{SR})+\Delta_{F\_PUCCH}(F)+\Delta_{TxD}(F')+g(i)\right)/10}\right)$$ [dB]

where, $P_{O\_PUSCH,c}(1)$, $\alpha_c(1)$ and $f_c(i)$ are the primary cell parameters as defined in clause 5.1.1.1, $P_{CMAX,c}(i)$, $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are also defined in clause 5.1.2.1.

If the UE does not transmit PUCCH or PUSCH in subframe i for the primary cell, power headroom for a Type 2 report is computed using $$PH_{type2}(i) = \tilde{P}_{CMAX,c}(i) - 10\log_{10}\left(10^{(P_{O\_PUSCH,c}(1)+\alpha_c(1)\cdot PL_c+f_c(i))/10} + 10^{(P_{0\_PUCCH}+PL_c+g(i))/10}\right)$$ [dB]

where, $\tilde{P}_{CMAX,c}(i)$ is computed assuming MPR=0 dB, A-MPR=0 dB, P-MPR=0 dB and $\Delta T_C$=0 dB, where MPR, A-MPR, P-MPR and $\Delta T_C$ are defined in [6], $P_{O\_PUSCH,c}(1)$, $\alpha_c(1)$ and $f_c(i)$ are the primary cell parameters as defined in clause 5.1.1.1 and $P_{O\_PUCCH}$, $PL_c$ and $g(i)$ are defined in clause 5.1.2.1.

The power headroom shall be rounded to the closest value in the range [40; −23] dB with steps of 1 dB and is delivered by the physical layer to higher layers.

5.1.2 Physical Uplink Control Channel 5.1.2.1 UE Behaviour

If serving cell c is the primary cell, the setting of the UE Transmit power $P_{PUCCH}$ for the physical uplink control channel (PUCCH) transmission in subframe i is defined by $$P_{PUCCH}(i) = \min\left\{\begin{array}{l}P_{CMAX,c}(i),\\ P_{0\_PUCCH} + PL_c + h(n_{CQI}, n_{HARQ}, n_{SR}) +\\ \Delta_{F\_PUCCH}(F) + \Delta_{TxD}(F') + g(i)\end{array}\right\}$$ [dBm]

If the UE is not transmitting PUCCH for the primary cell, for the accumulation of TPC command for PUCCH, the UE shall assume that the UE transmit power $P_{PUCCH}$ for PUCCH in subframe i is computed by $$P_{PUCCH}(i) = \min\{P_{CMAX,c}(i), P_{O\_PUCCH} + PL_c + g(i)\}$$ [dBm]

where $P_{CMAX,c}(i)$ is the configured UE transmit power defined in [6] in subframe i for serving cell c. If the UE transmits PUSCH without PUCCH in subframe i for the serving cell c, for the accumulation of TPC command for PUCCH, the UE shall assume $P_{CMAX,c}(i)$ as given by clause 5.1.1.1. If the UE does not transmit PUCCH and PUSCH in subframe i for the serving cell c, for the accumulation of TPC command for PUCCH, the UE shall compute $P_{CMAX,c}(i)$ assuming MPR=0 dB, A-MPR=0 dB, P-MPR=0 dB and $\Delta T_C$=0 dB, where MPR, A-MPR, P-MPR and $\Delta T_C$ are defined in [6].

The parameter $\Delta_{F\_PUCCH}(F)$ is provided by higher layers. Each $\Delta_{F\_PUCCH}(F)$ value corresponds to a PUCCH format (F) relative to PUCCH format 1a, where each PUCCH format (F) is defined in Table 5.4-1 of [3].

If the UE is configured by higher layers to transmit PUCCH on two antenna ports, the value of $\Delta_{TxD}(F')$ is provided by higher layers where each PUCCH format F' is defined in Table 5.4-1 of [3]; otherwise, $\Delta_{TxD}(F')$=0.

$h(n_{CQI}, n_{HARQ}, n_{SR})$ is a PUCCH format dependent value, where $n_{CQI}$ corresponds to the number of information bits for the channel quality information defined in clause 5.2.3.3 in [4]. $n_{SR}$=1 if subframe i is configured for SR for the UE not having any associated transport block for UL-SCH, otherwise $n_{SR}$=0. If the UE is configured with more than one serving cell, or the UE is configured with one serving cell and transmitting using PUCCH format 3, the value of $n_{HARQ}$ is defined in clause 10.1; otherwise, $n_{HARQ}$ is the number of HARQ-ACK bits sent in subframe i.

For PUCCH format 1,1a and 1b $h(n_{CQI},n_{HARQ}, n_{SR})$=0

For PUCCH format 1b with channel selection, if the UE is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})$=0

For PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

For PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3 and when UE transmits HARQ-ACK/SR without periodic CSI,

If the UE is configured by higher layers to transmit PUCCH format 3 on two antenna ports, or if the UE transmits more than 11 bits of HARQ-ACK/SR $$h(n_{CQI}, n_{HARQ}, n_{SR}) = \frac{n_{HARQ} + n_{SR} - 1}{3}$$

Otherwise $$h(n_{CQI}, n_{HARQ}, n_{SR}) = \frac{n_{HARQ} + n_{SR} - 1}{2}$$

For PUCCH format 3 and when UE transmits HARQ-ACK/SR and periodic CSI,
  If the UE is configured by higher layers to transmit PUCCH format 3 on two antenna ports, or if the UE transmits more than 11 bits of HARQ-ACK/SR and CSI $$h(n_{CQI}, n_{HARQ}, n_{SR}) = \frac{n_{HARQ} + n_{SR} + n_{CQI} - 1}{3}$$

Otherwise $$h(n_{CQI}, n_{HARQ}, n_{SR}) = \frac{n_{HARQ} + n_{SR} + n_{CQI} - 1}{2}$$

$P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

$\delta_{PUCCH}$ is a UE specific correction value, also referred to as a TPC command, included in a PDCCH with DCI format 1A/1B/1D/1/2A/2/2B/2C/2D for the primary cell, or included in an EPDCCH with DCI format 1A/1B/1D/1/2A/2/2B/2C/2D for the primary cell, or sent jointly coded with other UE specific PUCCH correction values on a PDCCH with DCI format 3/3A whose CRC parity bits are scrambled with TPC-PUCCH-RNTI.

If a UE is not configured for EPDCCH monitoring, the UE attempts to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI on every subframe except when in DRX.

If a UE is configured for EPDCCH monitoring, the UE attempts to decode
  a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI as described in clause 9.1.1, and
  one or several EPDCCHs of DCI format 1A/1B/1D/1/2A/2/2B/2C/2D with the UE's C-RNTI or SPS C-RNTI, as described in clause 9.1.4.

If the UE decodes
  a PDCCH with DCI format 1A/1B/1D/1/2A/2/2B/2C/2D or
  an EPDCCH with DCI format 1A/1B/1D/1/2A/2/2B/2C/2D
  for the primary cell and the corresponding detected RNTI equals the C-RNTI or SPS C-RNTI of the UE and the TPC field in the DCI format is not used to determine the PUCCH resource as in clause 10.1, the UE shall use the $\delta_{PUCCH}$ provided in that PDCCH/EPDCCH.
else
  if the UE decodes a PDCCH with DCI format 3/3A, the UE shall use the $\delta_{PUCCH}$ provided in that PDCCH
  else the UE shall set $\delta_{PUCCH}$=0 dB.

$$g(i) = g(i-1) + \sum_{m=0}^{M-1} \delta_{PUCCH}(i - k_m)$$

where g(i) is the current PUCCH power control adjustment state and where g(0) is the first value after reset.
  For FDD, M=1 and $k_O$=4.
  For TDD, values of M and $k_m$ are given in Table 10.1.3.1-1.
  The $\delta_{PUCCH}$ dB values signalled on PDCCH with DCI format 1A/1B/1D/1/2A/2/2B/2C/2D or EPDCCH with DCI format 1A/1B/1D/1/2A/2/2B/2C/2D are given in Table 5.1.2.1-1. If the PDCCH with DCI format 1/1A/2/2A/2B/2C/2D or EPDCCH with DCI format 1/1A/2A/2/2B/2C/2D is validated as an SPS activation PDCCH/EPDCCH, or the PDCCH/EPDCCH with DCI format 1A is validated as an SPS release PDCCH/EPDCCH, then $\delta_{PUCCH}$ is 0 dB.
  The $\delta_{PUCCH}$ dB values signalled on PDCCH with DCI format 3/3A are given in Table 5.1.2.1-1 or in Table 5.1.2.1-2 as semi-statically configured by higher layers.
  If $P_{O\_UE\_PUCCH}$ value is changed by higher layers,
    g(0)=0
  Else
    g(0)=$\Delta P_{rampup}$+$\delta_{msg2}$, where
      $\delta_{msg2}$ is the TPC command indicated in the random access response corresponding to the random access preamble transmitted in the primary cell, see clause 6.2 and
      If UE is transmitting PUCCH in subframe i, $$\Delta P_{rampup} = \min\left[\left\{\max\left(0, P_{CMAX,c} - \begin{pmatrix} P_{O\_PUCCH} + PL_c + \\ h(n_{CQI}, n_{HARQ}, n_{SR}) + \\ \Delta_{F\_PUCCH}(F) + \Delta_{TxD}(F') \end{pmatrix}\right)\right\}, \Delta P_{rampuprequested}\right]$$

Otherwise,
        $\Delta_{rampup}$=min[{max(0,$P_{CMAX,c}$-($P_{O\_PUCCH}$+$PL_c$))}, $\Delta P_{rampuprequested}$] and $\Delta P_{rampuprequested}$ is provided by higher layers and corresponds to the total power ramp-up requested by higher layers from the first to the last preamble in the primary cell
      If UE has reached $P_{CMAX,c}$(i) for the primary cell, positive TPC commands for the primary cell shall not be accumulated
      If UE has reached minimum power, negative TPC commands shall not be accumulated
      UE shall reset accumulation
        when $P_{O\_UE\_PUCCH}$ value is changed by higher layers when the UE receives a random access response message for the primary cell g(i)=g(i−1) if i is not an uplink subframe in TDD.

TABLE 5.1.2.1-1

Mapping of TPC Command Field in DCI format
1A/1B/1D/1/2A/2B/2C/2D/2/3 to $\delta_{PUCCH}$ values

| TPC Command Field in DCI format 1A/1B/ 1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 5.1.2.1-2

Mapping of TPC Command Field in
DCI format 3A to $\delta_{PUCCH}$ values

| TPC Command Field in DCI format 3A | $\delta_{PUCCH}$ [dB] |
|---|---|
| 0 | −1 |
| 1 | 1 |

5.1.3 Sounding Reference Symbol (SRS)
5.1.3.1 UE Behaviour

The setting of the UE Transmit power $P_{SRS}$ for the SRS transmitted on subframe i for serving cell c is defined by $$P_{SRS,c}(i) = \min\left\{\begin{array}{l} P_{CMAX,c}(i), P_{SRS\_OFFSET,c}(m) + 10\log_{10}(M_{SRS,c}) + \\ P_{O\_PUSCH,c}(j) + \alpha_c(j) \cdot PL_c + f_c(i) \end{array}\right\} [dBm]$$

where
$P_{CMAX,c}(i)$ is the configured UE transmit power defined in [6] in subframe i for serving cell c.
$P_{SRS\_OFFSET,c}(m)$ is semi-statically configured by higher layers for m=0 and m=1 for serving cell c. For SRS transmission given trigger type 0 then m=0 and for SRS transmission given trigger type 1 then m=1.
$M_{SRS,c}$ is the bandwidth of the SRS transmission in subframe i for serving cell c expressed in number of resource blocks.
$f_c(i)$ is the current PUSCH power control adjustment state for serving cell c, see clause 5.1.1.1.

$P_{O\_PUSCH,c}(J)$ and $\alpha_c(j)$ are parameters as defined in clause 5.1.1.1, where j=1.

If the total transmit power of the UE for the Sounding Reference Symbol in an SC-FDMA symbol would exceed $\hat{P}_{CMAX}(i)$, the UE scales $\hat{P}_{SRS,c}(i)$ for the serving cell c and the SC-FDMA symbol in subframe i such that the condition $$\sum_c w(i) \cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ defined in [6] in subframe i and w(i) is a scaling factor of $\hat{P}_{SRS,c}(i)$ for serving cell c where 0<w(i)≤1. Note that w(i) values are the same across serving cells.

If the UE is configured with multiple TAGs and the SRS transmission of the UE in an SC-FDMA symbol for a serving cell in subframe i in a TAG overlaps with the SRS transmission in another SC-FDMA symbol in subframe i for a serving cell in another TAG, and if the total transmit power of the UE for the Sounding Reference Symbol in the overlapped portion would exceed $\hat{P}_{CMAX}(i)$, the UE scales $\hat{P}_{SRS,c}(i)$ for the serving cell c and each of the overlapped SRS SC-FDMA symbols in subframe i such that the condition $$\sum_c w(i) \cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ defined in [6] in subframe i and w(i) is a scaling factor of $\hat{P}_{SRS,c}(i)$ for serving cell c where 0<w(i)≤1. Note that w(i) values are the same across serving cells.

Annex 2: Excerpt from 3GPP TS 36.331 v11.5.0
6.3.2 Radio Resource Control Information Elements
    RadioResourceConfigCommon The IE RadioResourceConfigCommonSIB and IE RadioResourceConfigCommon are used to specify common radio resource configurations in the system information and in the mobility control information, respectively, e.g., the random access parameters and the static physical layer parameters.

RadioResourceConfigCommon Information Element

```
-- ASN1START
RadioResourceConfigCommonSIB ::=    SEQUENCE {
    rach-ConfigCommon                   RACH-ConfigCommon,
    bcch-Config                         BCCH-Config,
    pcch-Config                         PCCH-Config,
    prach-Config                        PRACH-ConfigSIB,
    pdsch-ConfigCommon                  PDSCH-ConfigCommon,
    pusch-ConfigCommon                  PUSCH-ConfigCommon,
    pucch-ConfigCommon                  PUCCH-ConfigCommon,
    soundingRS-UL-ConfigComon           SoundingRS-UL-ConfigCommon,
    uplinkPowerControlCommon            UplinkPowerControlCommon,
    ul-CyclicPrefixLength               UL-CyclicPrefixLength,
    ...,
    [[  uplinkPowerControlCommon-v1020  UplinkPowerControlCommon-v1020  OPTIONAL    --
Need OR
    ]]
}
```

```
RadioResourceConfigCommon ::=         SEQUENCE {
    rach-ConfigCommon                 RACH-ConfigCommon              OPTIONAL,    -- Need ON
    prach-Config                      PRACH-Config,
    pdsch-ConfigCommon                PDSCH-ConfigCommon             OPTIONAL,    -- Need ON
    pusch-ConfigCommon                PUSCH-ConfigCommon,
    phich-Config                      PHICH-Config                   OPTIONAL,    -- Need ON
    pucch-ConfigCommon                PUCCH-ConfigCommon             OPTIONAL,    -- Need ON
    soundingRS-UL-ConfigCommon        SoundingRS-UL-ConfigCommon     OPTIONAL,    -- Need ON
    uplinkPowerControlCommon          UplinkPowerControlCommon       OPTIONAL,    -- Need ON
    antennaInfoCommon                 AntennaInfoCommon              OPTIONAL,    -- Need ON
    p-Max                             P-Max                          OPTIONAL,    -- Need OP
    tdd-Config                        TDD-Config                     OPTIONAL,    -- Cond TDD
    ul-CyclicPrefixLength             UL-CyclicPrefixLength,
    ...,
    [[ uplinkPowerControlCommon-v1020  UplinkPowerControlCommon-v1020 OPTIONAL    -- Need ON
    ]],
    [[ tdd-Config-v1130               TDD-Config-v1130               OPTIONAL    -- Cond TDD3
    ]]
}
RadioResourceConfigCommonSCell-r10 ::=   SEQUENCE {
    -- DL configuration as well as configuration applicable for DL and UL
    nonUL-Configuration-r10           SEQUENCE {
        -- 1: Cell characteristics
        dl-Bandwidth-r10              ENUMERATED {n6, n15, n25, n50, n75, n100},
        -- 2: Physical configuration, general
        antennaInfoCommon-r10         AntennaInfoCommon,
        mbsfn-SubframeConfigList-r10  MBSFN-SubframeConfigList    OPTIONAL,    -- Need OR
        -- 3: Physical configuration, control
        phich-Config-r10              PHICH-Config,
        -- 4: Physical configuration, physical channels
        pdsch-ConfigCommon-r10        PDSCH-ConfigCommon,
        tdd-Config-r10                TDD-Config                  OPTIONAL    -- Cond TDDSCell
    },
    -- UL configuration
    ul-Configuration-r10              SEQUENCE {
        ul-FreqInfo-r10               SEQUENCE {
            ul-CarrierFreq-r10        ARFCN-ValueEUTRA            OPTIONAL,    -- Need OP
            ul-Bandwidth-r10          ENUMERATED {n6, n15,
                                          n25, n50, n75, n100}    OPTIONAL,    -- NEED OP
            additionalSpectrumEmissionSCell-r10    AdditionalSpectrumEmission
        },
        p-Max-r10                     P-Max                       OPTIONAL,    -- Need OP
        uplinkPowerControlCommonSCell-r10    UplinkPowerControlCommonSCell-r10,
        -- A special version of IE UplinkPowerControlCommon may be introduced
        -- 3: Physical configuration, control
        soundingRS-UL-ConfigCommon-r10    SoundingRS-UL-ConfigCommon,
        ul-CyclicPrefixLength-r10         UL-CyclicPrefixLength,
        -- 4: Physical configuration, physical channels
        prach-ConfigSCell-r10         PRACH-ConfigSCell-r10       OPTIONAL,    -- Cond TDD-OR-NoR11
        pusch-ConfigCommon-r10        PUSCH-ConfigCommon
    }                                                             OPTIONAL,    -- Need OR
    ...,
    [[ ul-CarrierFreq-v1090           ARFCN-ValueEUTRA-v9e0       OPTIONAL    -- Need OP
    ]],
    [[ rach-ConfigCommonSCell-r11     RACH-ConfigCommonSCell-r11  OPTIONAL,    -- Cond UL
       prach-ConfigSCell-r11          PRACH-Config                OPTIONAL,    -- Cond UL
       tdd-Config-v1130               TDD-Config-v1130            OPTIONAL,    -- Cond
```

-continued

```
TDD2
        uplinkPowerControlCommonSCell-v1130
                                    UplinkPowerControlCommonSCell-v1130 OPTIONAL      -- Cond UL
    ]]
}
BCCH-Config ::=                 SEQUENCE {
    modificationPeriodCoeff         ENUMERATED {n2, n4, n8, n16}
}
PCCH-Config ::=                 SEQUENCE {
    defaultPagingCycle              ENUMERATED {
                                        rf32, rf64, rf128, rf256},
    nB                              ENUMERATED {
                                        fourT, twoT, oneT, halfT, quarterT, oneEighthT,
                                        oneSixteenthT, oneThirtySecondT}
}
UL-CyclicPrefixLength ::=       EMUMERATED {len1, len2}
-- ASN1STOP
```

| RadioResourceConfigCommon field descriptions |
| --- |
| additionalSpectrumEmissionSCell |
| The UE requirements related to IE AdditionalSpectrumEmissionSCell are defined in TS 36.101 [42]. |
| defaultPagingCycle |
| Default paging cycle, used to derive 'T' in TS 36.304 [4]. Value rf32 corresponds to 32 radio frames, rf64 corresponds to 64 radio frames and so on. |
| modificationPeriodCoeff |
| Actual modification period, expressed in number of radio frames = modificationPeriodCoeff * defaultPagingCycle. n2 corresponds to value 2, n4 corresponds to value 4, n8 corresponds to value 8 and n16 corresponds to value 16. |
| nB |
| Parameter: nB is used as one of parameters to derive the Paging Frame and Paging Occasion according to TS 36.304 [4]. Value in multiples of 'T' as defined in TS 36.304 [4]. A value of fourT corresponds to 4 * T, a value of twoT corresponds to 2 * T and so on. |
| p-Max |
| Pmax to be used in the target cell. If absent the UE applies the maximum power according to the UE capability. |
| ul-Bandwidth |
| Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| ul-CarrierFreq |
| For FDD: If absent, the (default) value determined from the default TX-RX frequency separation defined in TS 36.101 [42, table 5.7.3-1] applies.<br>For TDD: This parameter is absent and it is equal to the downlink frequency. |
| UL-CyclicPrefixLength |
| Parameter: Uplink cyclic prefix length see 36.211 [21, 5.2.1] where len1 corresponds to normal cyclic prefix and len2 corresponds to extended cyclic prefix. |

| Conditional presence | Explanation |
| --- | --- |
| TDD | The field is optional for TDD, Need ON; it is not present for FDD and the UE shall delete any existing value for this field. |
| TDD2 | If tdd-Config or tdd-Config-r10 is present, the field is optional, Need OR. Otherwise the field is not present and the UE shall delete any existing value for this field. |
| TDD3 | If tdd-Config or tdd-Config-r10 is present, the field is optional, Need OR. Otherwise the field is not present. |
| TDD-OR-NoR11 | If prach-ConfigSCell-r11 is absent, the field is optional for TDD, Need OR. Otherwise the field is not present and the UE shall delete any existing value for this field. |
| TDDSCell | This field is mandatory present for TDD; it is not present for FDD and the UE shall delete any existing value for this field. |
| UL | If the SCell is part of the STAG and if ul-Configuration is included, the field is optional, Need OR. Otherwise the field is not present and the UE shall delete any existing value for this field. |

The invention claimed is:

1. A method performed in a network node, for enabling transmit power control of a wireless device that is configured to support two or more contemporaneous links with two or more corresponding wireless access points, the method comprising:

obtaining a separate configured transmit power value ($P_1$, $P_2$, ... $P_i$) for the wireless device per contemporaneous link with the two or more corresponding wireless access points; and transmitting at least one of the obtained configured transmit power values to another network node, and wherein a sum of all of the separate configured transmit power values for the two or more contemporaneous links with the two or more corresponding wireless access points does not exceed a maximum allowed transmit power ($P_{TOTALMAX}$) for the wireless device minus a threshold value ($P_{thresh}$) as determined by:

$$P_1+P_2+\ldots+P_i<(P_{TOTALMAX})-(P_{thresh})$$

wherein $P_{thresh}$ is related to a tolerance value for the maximum allowed transmit power for the wireless device.

2. The method according to claim 1, wherein the separate configured transmit power values are determined based on a total power constraint for the wireless device.

3. The method according to claim 2, wherein the separate configured transmit power values are determined based on one or more of: a power headroom report from the wireless device, information on a Reference Signal Received Power, RSRP, or a Reference Signal Received Quality, RSRQ, of the wireless device, a buffer status of the wireless device, priority of a corresponding contemporaneous link.

4. The method according to claim 3, wherein the separate configured transmit power values are determined based on one or more of the following rules:
    determining a higher configured transmit power value for a link with a larger corresponding buffer size, as compared to another contemporaneous link;
    determining a higher configured transmit power value for a link which has a higher priority, as compared to another contemporaneous link;
    determining a higher configured transmit power value for a link having a lower RSRP and/or RSRQ value, as compared to another contemporaneous link.

5. The method according to claim 2, wherein different configured transmit power values for a link are determined for different subframes and/or for different channels or signals.

6. The method according to claim 5, comprising determining a time-varying pattern for the configured transmit power value for one or more of the contemporaneous links.

7. The method according to claim 1, wherein the configured transmit power values are determined based on different criteria during different time intervals.

8. The method according to claim 1, further comprising:
    scheduling the wireless device in the uplink based on the configured transmit power value corresponding to the link between the network node and the wireless device.

9. The method according to claim 1, further comprising:
    receiving a power headroom report from the wireless device; and
    scheduling the wireless device on one of the contemporaneous links, based on the configured transmit power for that link, and the received power headroom report.

10. The method according to claim 9, further comprising determining the actual power headroom available to the wireless device for transmission on one of the contemporaneous links, based on the received power headroom report and on the obtained configured transmit power value for that link.

11. A method performed in a wireless device configured to support two or more contemporaneous links with two or more corresponding wireless access points, the method comprising:
    receiving a separate configured transmit power value for the wireless device for each contemporaneous link with the two or more corresponding wireless access points;
    receiving a plurality of uplink grants with respect to a subframe k;
    determining that contemporaneous transmission on the two or more contemporaneous links with the two or more corresponding wireless access points will be performed based on having received the plurality of uplink grants with respect to the subframe k; and
    applying power control to transmissions on each contemporaneous link in subframe k based on the configured transmit power value corresponding to the respective link, and
    wherein a sum of all of the separate configured transmit power values for the two or more contemporaneous links with the two or more corresponding wireless access points does not exceed a maximum allowed transmit power ($P_{TOTALMAX}$) for the wireless device minus a threshold value ($P_{thresh}$) as determined by:

$$P_1+P_2+\ldots+P_i<(P_{TOTALMAX})-(P_{thresh})$$

wherein $P_{thresh}$ is related to a tolerance value for the maximum allowed transmit power for the wireless device.

12. The method according to claim 11, further comprising receiving an indication to vary one or more of the configured transmit power values according to a time pattern, and applying power control to transmissions on the corresponding link or links according to the time pattern.

13. A wireless device configured to support two or more contemporaneous links with two or more corresponding wireless access points, the wireless device comprising:
    a memory comprising instructions; and
    a processor configured to execute the instructions to cause the processor to:
        receive a separate configured transmit power value for each contemporaneous link with the two or more corresponding wireless access points;
        receive a plurality of uplink grants with respect to a subframe k;
        determining that contemporaneous transmission on the two or more contemporaneous links with the two or more corresponding wireless access points will be performed based on having received the plurality of uplink grants with respect to the subframe k; and
        apply power control to transmissions on each contemporaneous link in subframe k based on the configured transmit power value corresponding to the respective link, and
    wherein a sum of all of the separate configured transmit power values for the two or more contemporaneous links with the two or more corresponding wireless access points does not exceed a maximum allowed transmit power ($P_{TOTALMAX}$) for the wireless device minus a threshold value ($P_{thresh}$) as determined by:

$$P_1+P_2+\ldots+P_i<(P_{TOTALMAX})-(P_{thresh})$$

wherein $P_{thresh}$ is related to a tolerance value for the maximum allowed transmit power for the wireless device.

14. The wireless device according to claim 13, wherein the processor is further configured to execute the instruction to:
    receive an indication to vary one or more of the configured transmit power values according to a time pattern; and to
    apply power control to transmissions on the corresponding link or links according to the time pattern.

15. A network node configured for enabling transmit power control of a wireless device that is configured to support two or more contemporaneous links with two or more corresponding wireless access points, the network node comprising:
  a memory comprising instructions; and
  a processor configured to execute the instructions to cause the processor to:
    obtain a separate configured transmit power value ($P_1$, $P_2$, ... $P_i$) for the wireless device per contemporaneous link with the two or more corresponding wireless access points; and
    transmit at least one of the obtained configured transmit power values to another network node, and
  wherein a sum of all of the separate configured transmit power values for the two or more contemporaneous links with the two or more corresponding wireless access points does not exceed a maximum allowed transmit power ($P_{TOTALMAX}$) for the wireless device minus a threshold value ($P_{thresh}$) as determined by:

$$P_1 + P_2 + \ldots + P_i < (P_{TOTALMAX}) - (P_{thresh})$$

wherein $P_{thresh}$ is related to a tolerance value for the maximum allowed transmit power for the wireless device.

16. The network node according to claim 15, wherein the separate configured transmit power values are determined based on one or more of the following rules:
  determining a higher configured transmit power value for a link with a larger corresponding buffer size, as compared to another contemporaneous link;
  determining a higher configured transmit power value for a link which has a higher priority, as compared to another contemporaneous link;
  determining a higher configured transmit power value for a link having a lower RSRP and/or RSRQ value, as compared to another contemporaneous link.

17. The network node according to claim 15, wherein:
  the separate configured transmit power values are determined based on a total power constraint for the wireless device, and
  the different configured transmit power values for a link are determined for different subframes and/or for different channels or signals.

18. The network node according to claim 15, wherein the processor is further configured to:
  receive a power headroom report from the wireless device;
  determine the actual power headroom available to the wireless device for transmission on one of the contemporaneous links, based on the received power headroom report and on the obtained configured transmit power value for that link; and
  schedule the wireless device on one of the contemporaneous links, based on the configured transmit power for that link, and the received power headroom report.

* * * * *